US012607725B2

(12) United States Patent
Tayu

(10) Patent No.: US 12,607,725 B2
(45) Date of Patent: Apr. 21, 2026

(54) LIGHT RECEIVING DEVICE AND RANGE-FINDING DEVICE

(71) Applicant: Sony Semiconductor Solutions Corporation, Kanagawa (JP)

(72) Inventor: Kenichi Tayu, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1215 days.

(21) Appl. No.: 17/435,223

(22) PCT Filed: Feb. 28, 2020

(86) PCT No.: PCT/JP2020/008420
§ 371 (c)(1),
(2) Date: Aug. 31, 2021

(87) PCT Pub. No.: WO2020/179696
PCT Pub. Date: Sep. 10, 2020

(65) Prior Publication Data
US 2022/0137194 A1 May 5, 2022

(30) Foreign Application Priority Data
Mar. 7, 2019 (JP) ................................. 2019-041998

(51) Int. Cl.
G01S 7/486 (2020.01)
G01S 7/4863 (2020.01)
G01S 17/10 (2020.01)

(52) U.S. Cl.
CPC ............ *G01S 7/4868* (2013.01); *G01S 17/10* (2013.01); *G01S 7/4863* (2013.01)

(58) Field of Classification Search
CPC ...... G01S 7/4868; G01S 17/10; G01S 7/4863; G01S 7/4816; G01S 7/4861;
(Continued)

(56) References Cited

U.S. PATENT DOCUMENTS 6,130,713 A * 10/2000 Merrill ................. G01S 7/4863
348/297
10,158,038 B1 12/2018 Do Valle
(Continued)

FOREIGN PATENT DOCUMENTS

CN 104729724 A 6/2015
CN 108681362 A 10/2018
(Continued)

OTHER PUBLICATIONS

International Search Report (PCT/ISA/210), International Application No. PCT/JP2020/008420, dated May 20, 2020.
(Continued)

*Primary Examiner* — Isam A Alsomiri
*Assistant Examiner* — Joseph C Fritchman
(74) *Attorney, Agent, or Firm* — Michael Best & Friedrich LLP

(57) ABSTRACT

A light receiving device according to an embodiment includes: a light receiving element (1000) in which a current flows because of avalanche multiplication caused in accordance with a photon that has been incident on the light receiving element in a state in which the light receiving element is charged to a predetermined potential based on a bias voltage, the light receiving element returning to said state by a recharge current; a detection unit (1002) configured to detect the current, and invert an output signal in a case in which a current value of the current exceeds a threshold; a current source (1001) configured to supply the recharge current to the light receiving element; and a switch unit (1010) configured to control supply of the bias voltage to the light receiving element in accordance with the output signal of the detection unit.

22 Claims, 19 Drawing Sheets

(58) Field of Classification Search
CPC ........ G01S 7/4865; G01S 7/487; G01S 17/89;
H10F 77/959; H04N 25/773; H04N
25/772
See application file for complete search history.

(56) References Cited

U.S. PATENT DOCUMENTS

| | | | | |
|---|---|---|---|---|
| 2008/0290259 A1* | 11/2008 | Mathewson | ......... | H04N 25/773 |
| | | | | 250/214 R |
| 2011/0266420 A1* | 11/2011 | Eldesouki | ............. | H10F 77/953 |
| | | | | 250/214.1 |
| 2018/0164415 A1* | 6/2018 | Buckley | .................. | G01S 17/18 |
| 2018/0211990 A1* | 7/2018 | Yorikado | ............... | H04N 25/76 |
| 2019/0302242 A1* | 10/2019 | Fenigstein | ............ | H10F 30/225 |

FOREIGN PATENT DOCUMENTS

| JP | 2006179828 A | 7/2006 |
|---|---|---|
| JP | 2008542706 A | 11/2008 |
| JP | 2018173379 A | 11/2018 |
| JP | 2018179732 A | 11/2018 |
| JP | 2019009768 A | 1/2019 |
| WO | WO-2009036802 A1 | 3/2009 |
| WO | 2017/094362 A1 | 6/2017 |
| WO | WO-2018211801 A1 | 11/2018 |
| WO | 2018/234309 A1 | 12/2018 |

OTHER PUBLICATIONS

Notification of Transmittal of the International Search Report and the Written Opinion of the International Searching Authority, or the Declaration (PCT/ISA/220), International Application No. PCT/JP2020/008420, dated Jun. 2, 2020.

Written Opinion of the International Search Authority (PCT/ISA/237), International Application No. PCT/JP2020/008420, dated Jun. 2, 2020.

* cited by examiner

Figure 22:
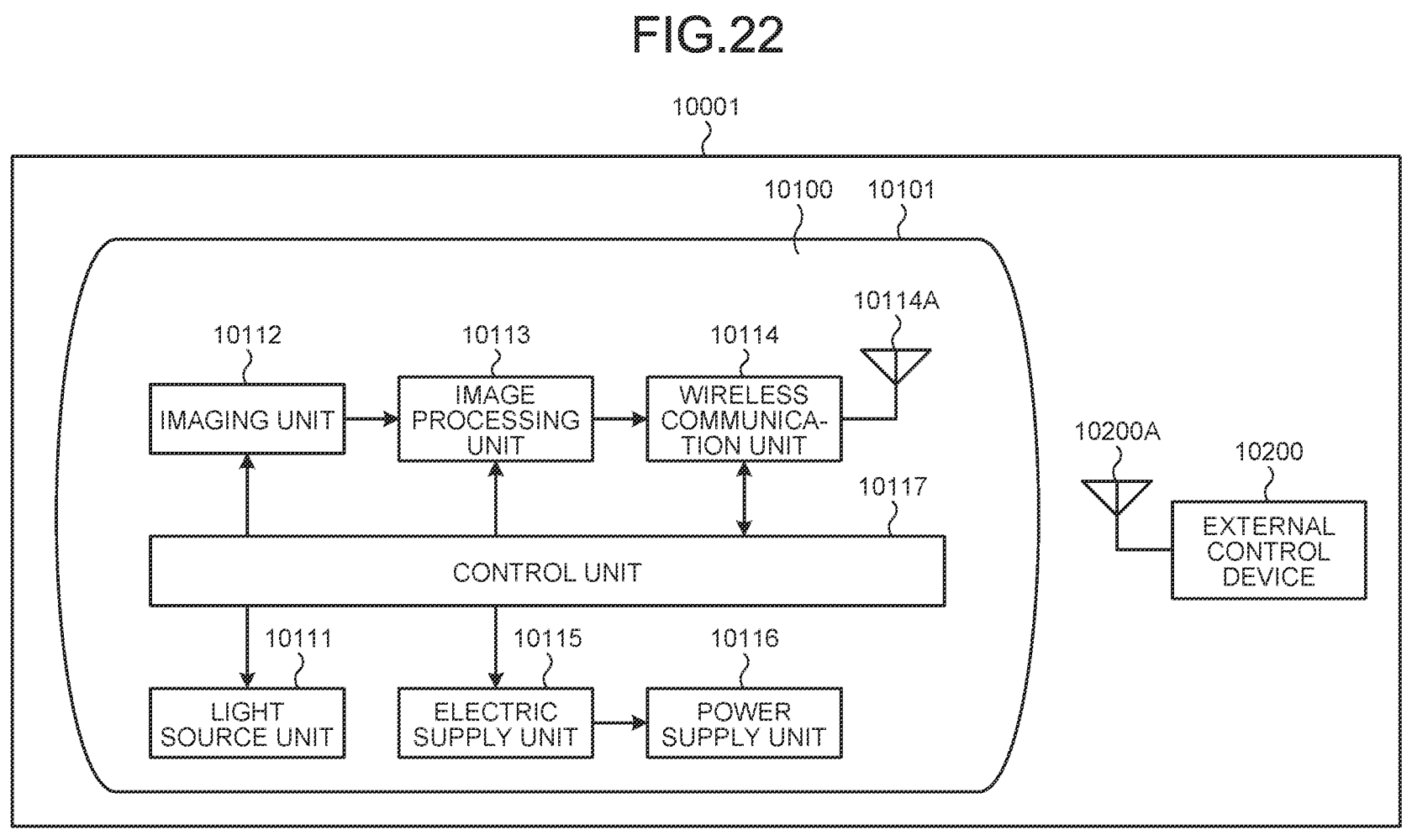

10200 EXTERNAL CONTROL DEVICE

10114A

10114 WIRELESS COMMUNICA-TION UNIT

10117 CONTROL UNIT

10113 IMAGE PROCESSING UNIT

10112 IMAGING UNIT

10115 ELECTRIC SUPPLY UNIT

10116 POWER SUPPLY UNIT

10111 LIGHT SOURCE UNIT

LIGHT RECEIVING DEVICE AND RANGE-FINDING DEVICE

FIELD

The present invention relates to a light receiving device and a range-finding device.

BACKGROUND

There are known light receiving elements that can photoelectrically covert received light into an electric signal to be output. As one of such light receiving elements, there is known a single photon avalanche diode (hereinafter, referred to as an SPAD) that can obtain a large current in accordance with incidence of one photon by avalanche multiplication. By using such a characteristic of the SPAD, incidence of one photon can be detected with high sensitivity.

The following briefly describes a photon detection operation performed by the SPAD. For example, a current source is connected to a cathode of the SPAD, the current source to which a power supply voltage Vdd is supplied and an output current thereof is controlled based on a reference voltage Vref. A large negative voltage (−Vbd) that causes avalanche multiplication is applied to an anode of the SPAD. In this state, when a photon is incident on the SPAD, avalanche multiplication is started, a current flows from the cathode of the SPAD toward the anode, and a voltage drop occurs in the SPAD accordingly. When a voltage between the anode and the cathode drops to the voltage (−Vbd), avalanche multiplication is stopped (quenching operation). Thereafter, the SPAD is charged by the current from the current source, and the state of the SPAD returns to a state before incidence of the photon (recharge operation).

CITATION LIST

Patent Literature

Patent Literature 1: Japanese Patent Application Laid-open No. 2008-542706

SUMMARY

Technical Problem

In the operation of the SPAD, a phenomenon called afterpulsing may occur such that light emission occurs inside the element based on an electron generated by avalanche multiplication, and avalanche multiplication occurs again in accordance with light emission inside the element. When afterpulsing occurs, avalanche multiplication is started without incidence of a photon on the SPAD, and operation control for the SPAD becomes difficult.

The present disclosure provides a light receiving device and a range-finding device that can control an operation of a light receiving element more stably.

Solution to Problem

For solving the problem described above, a light receiving device according to one aspect of the present disclosure has a light receiving element in which a current flows because of avalanche multiplication caused in accordance with a photon that has been incident on the light receiving element in a state in which the light receiving element is charged to a predetermined potential based on a bias voltage, the light receiving element returning to said state by a recharge current; a detection unit configured to detect the current, and invert an output signal in a case in which a current value of the current exceeds a threshold; a current source configured to supply the recharge current to the light receiving element; and a switch unit configured to control supply of the bias voltage to the light receiving element in accordance with the output signal of the detection unit.

BRIEF DESCRIPTION OF DRAWINGS

FIG. 16 is a diagram illustrating an exemplary configuration of a pixel according to a fifth modification of the first embodiment.

3

Figure 18:
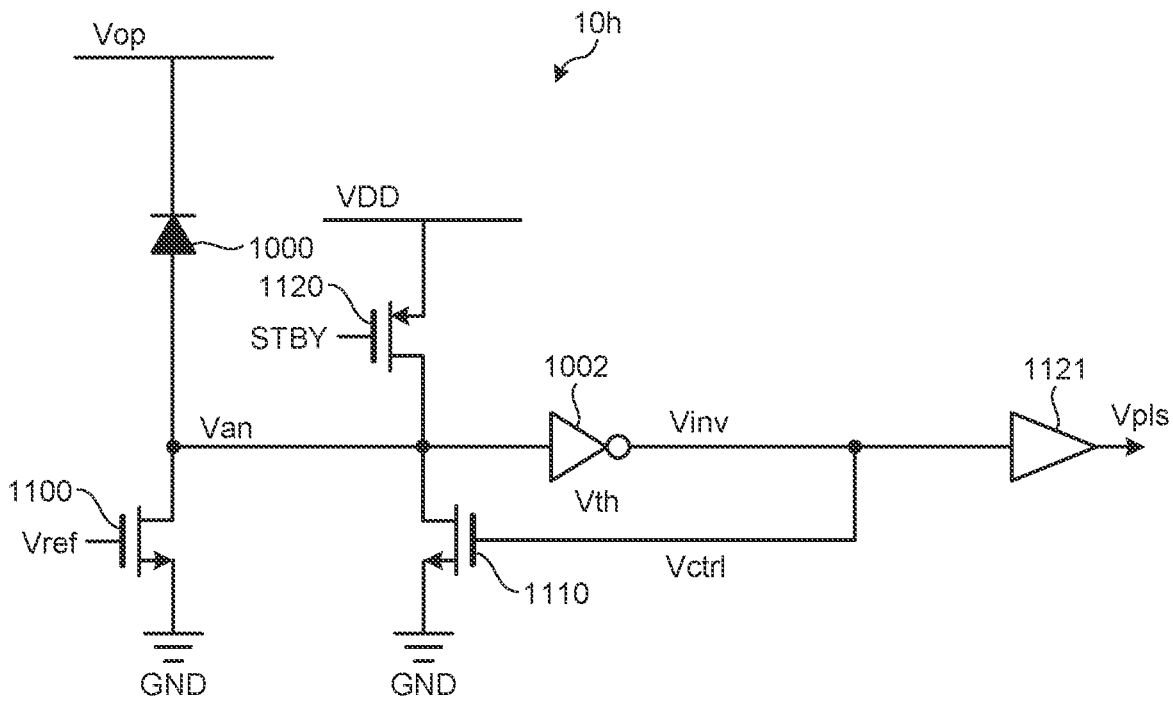

FIG. 18 is a diagram illustrating an exemplary configuration of a pixel according to a seventh modification of the first embodiment.

Figure 19:
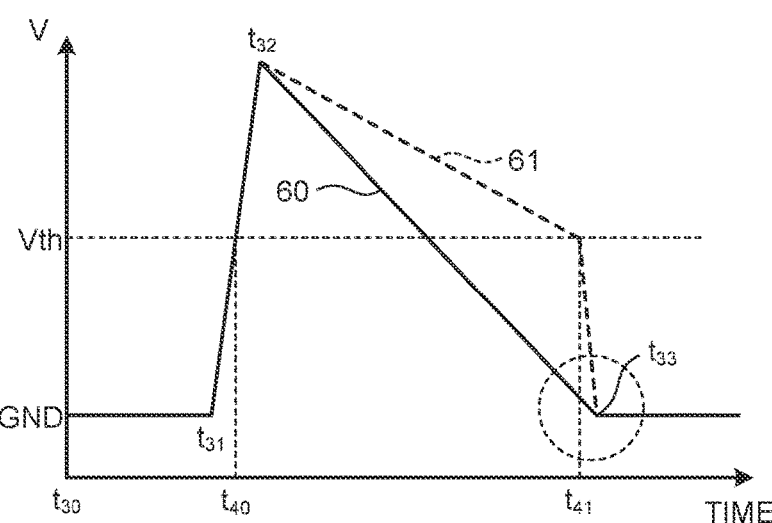

FIG. 19 is a diagram illustrating an example of variation in a voltage Van of an anode of the light receiving element in a configuration according to the seventh modification of the first embodiment.

Figure 20:
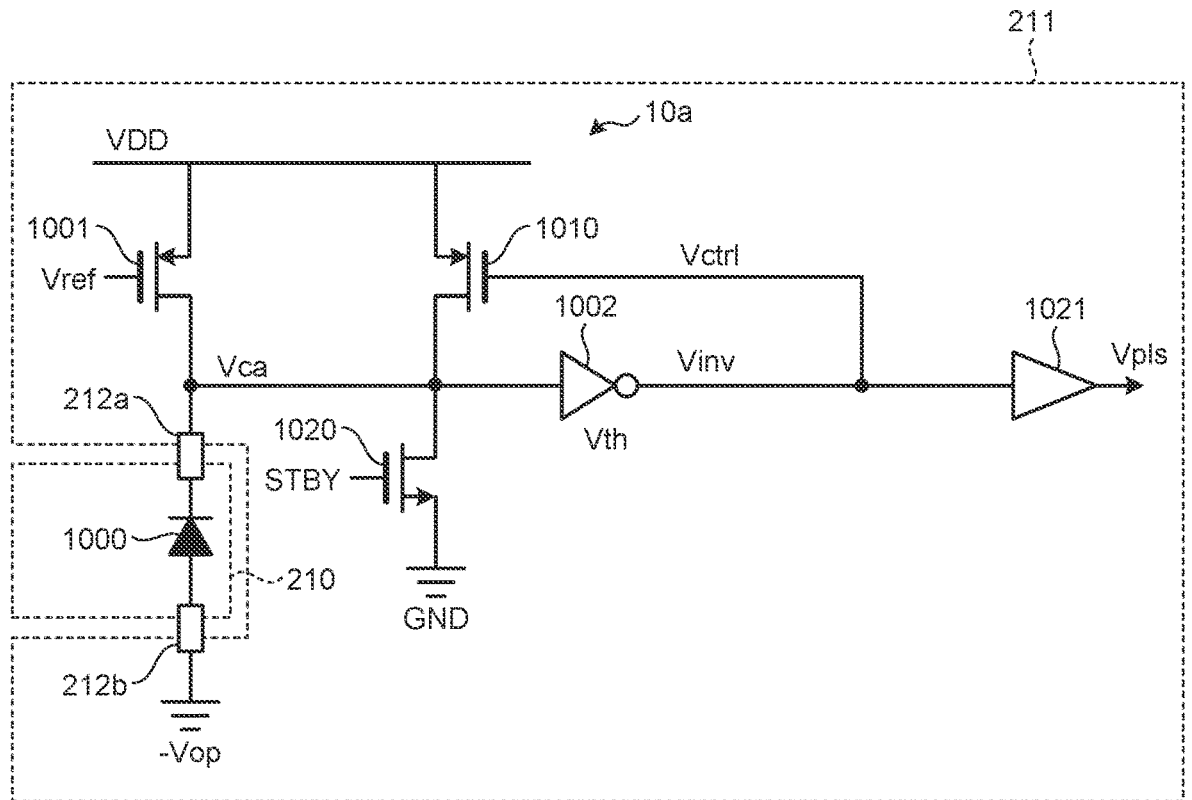

FIG. 20 is a diagram illustrating an example of disposition of parts of a pixel according to an eighth modification of the first embodiment.

Figure 21:
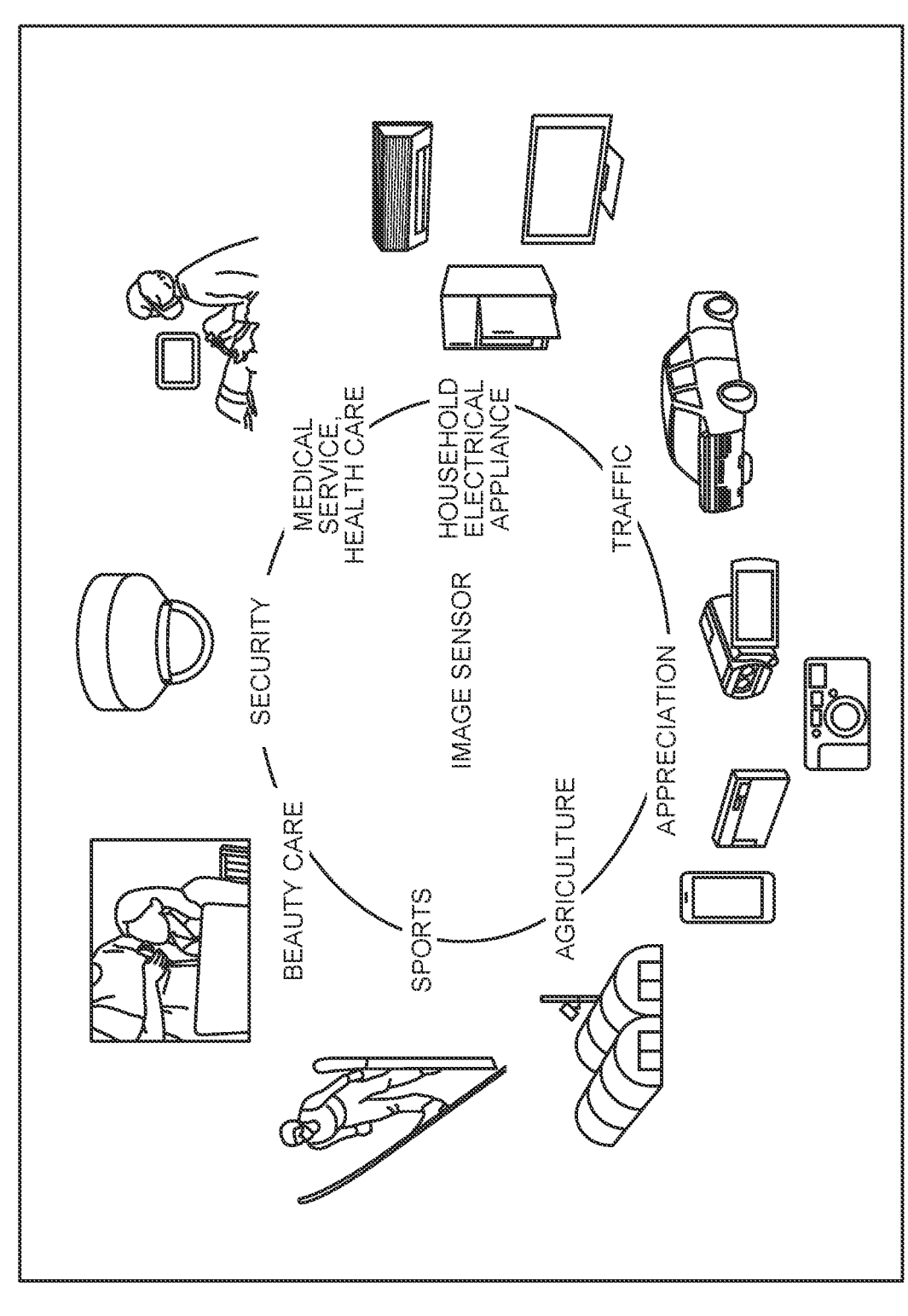

FIG. 21 is a diagram illustrating a usage example of using an electronic appliance with any of pixels according to the first embodiment and the modifications thereof.

FIG. 22 is a block diagram illustrating an example of a brief configuration of a body interior information acquisition system for a patient using a capsule type endoscope to which a technique according to the present disclosure may be applied.

Figure 23:
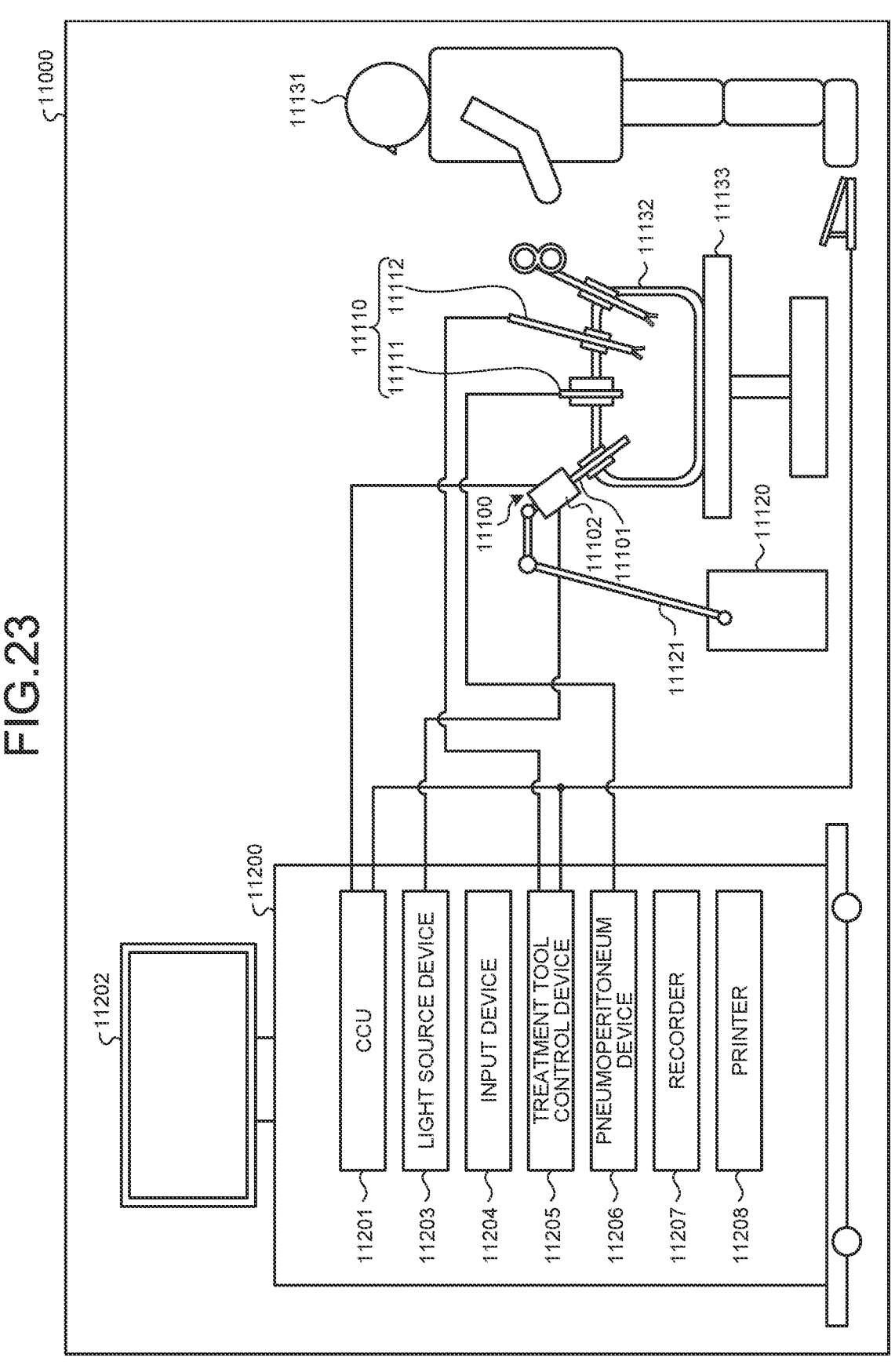

FIG. 23 is a diagram illustrating an example of a brief configuration of an endoscope surgery system to which a technique according to the present disclosure may be applied.

Figure 24:
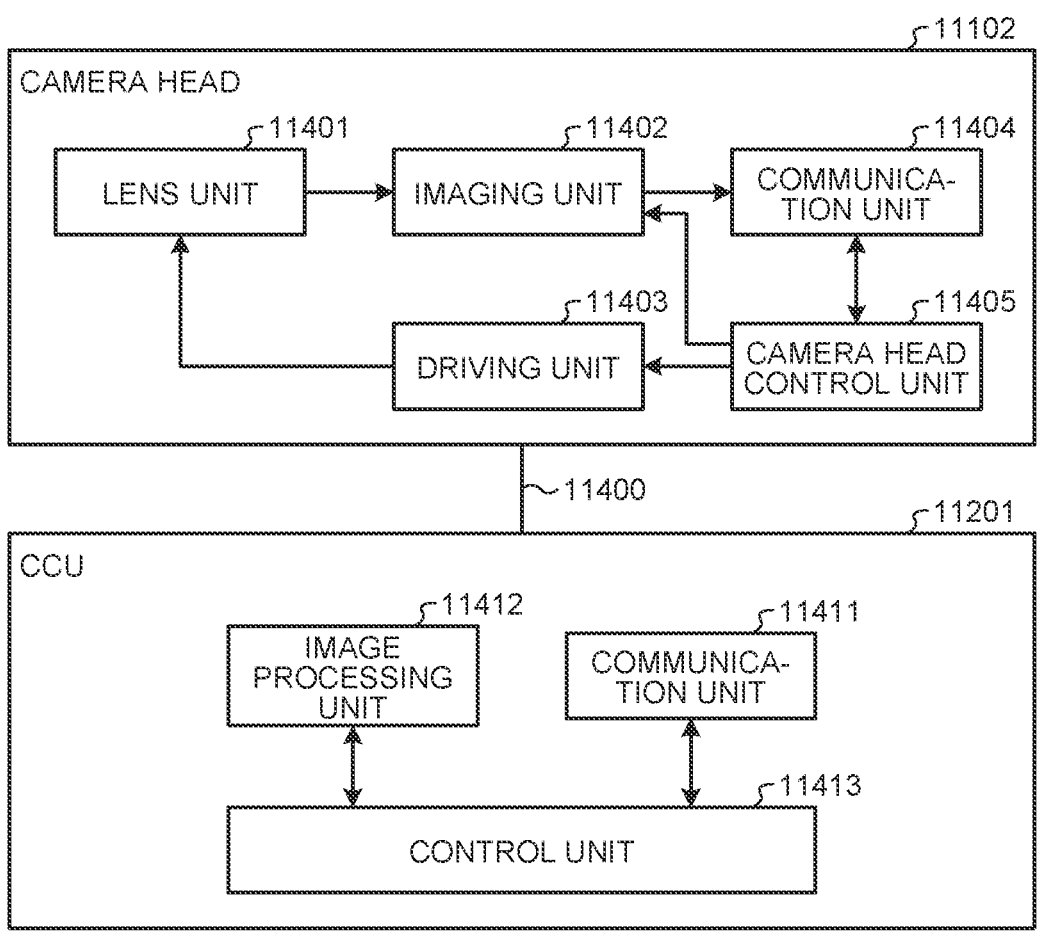

FIG. 24 is a block diagram illustrating an example of a functional configuration of a camera head and a CCU.

Figure 25:
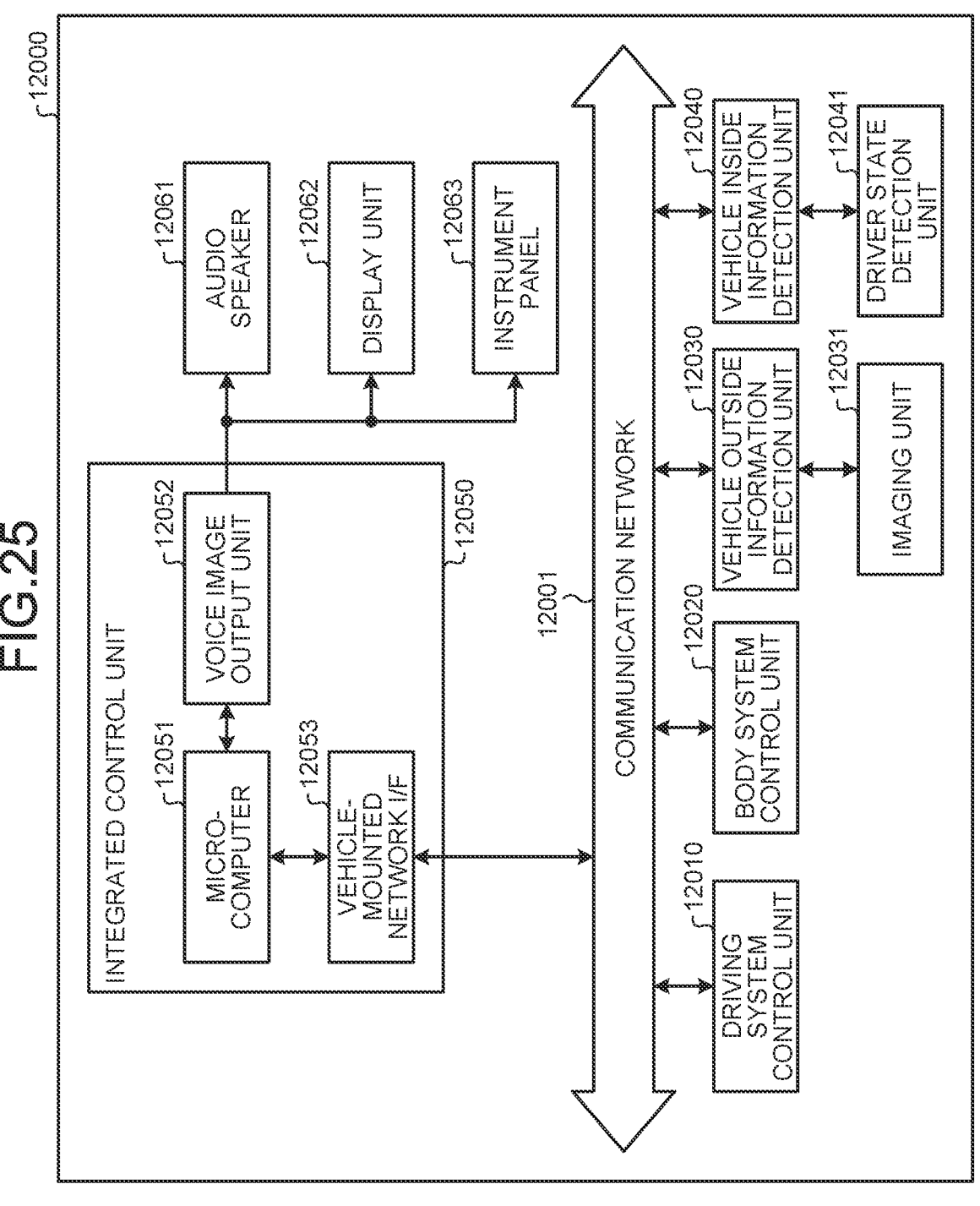

FIG. 25 is a block diagram illustrating a brief configuration example of a vehicle control system as an example of a mobile object control system to which the technique according to the present disclosure may be applied.

Figure 26:
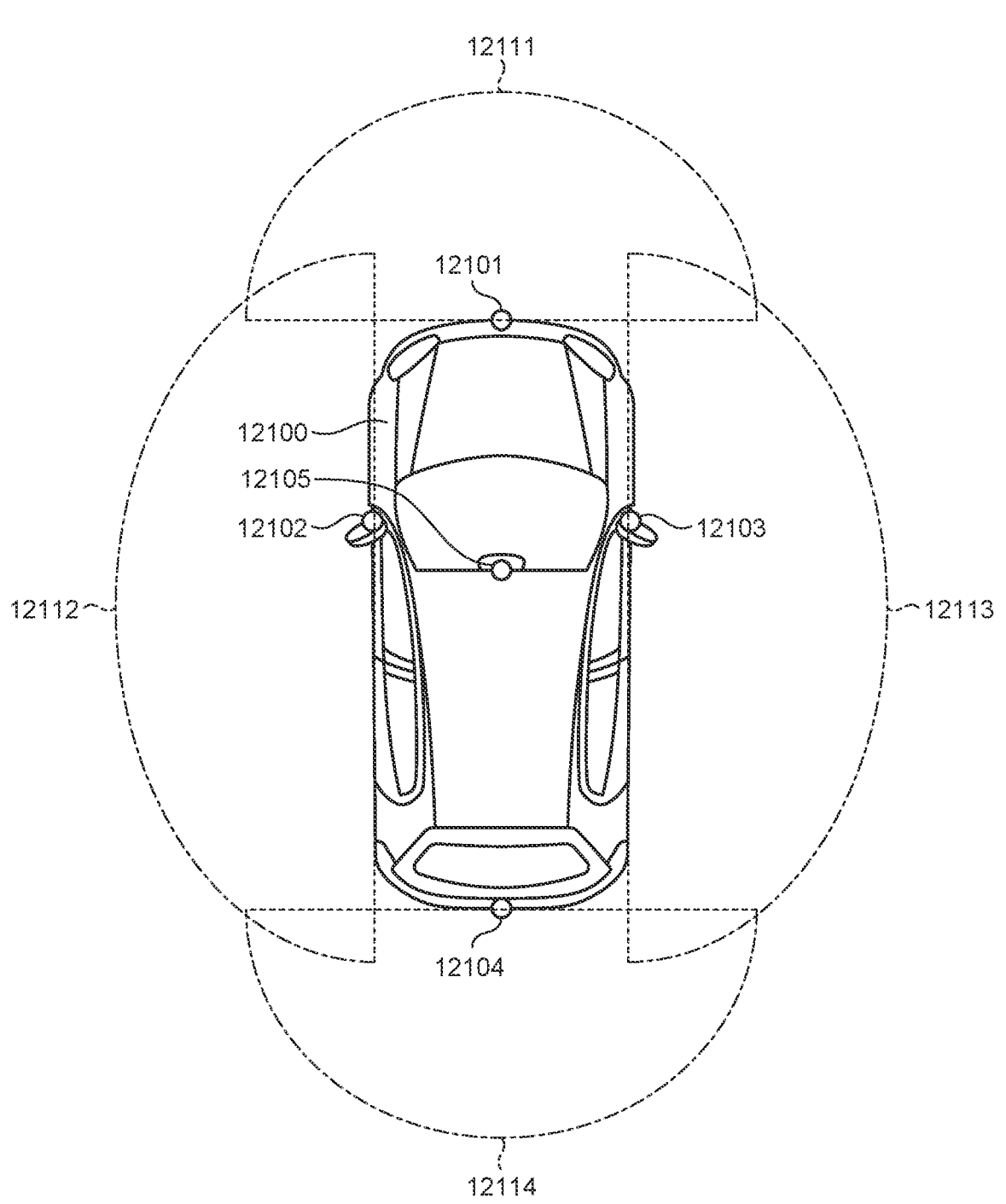

FIG. 26 is a diagram illustrating an example of disposed positions of imaging units.

DESCRIPTION OF EMBODIMENTS

The following describes embodiments of the present disclosure in detail based on the drawings. In the following embodiments, the same parts are denoted by the same reference numeral, and redundant description will not be repeated.

Configuration Common to Embodiments

The present disclosure is preferably used for a technique of detecting a photon. Before describing the embodiments of the present disclosure, to facilitate understanding, the following describes a technique of performing range-finding by detecting a photon as one of techniques that can be applied to each of the embodiments. In this case, a direct Time Of Flight (ToF) scheme is applied as a range-finding scheme. The direct ToF scheme is a scheme of receiving, by a light receiving element, reflected light that is emitted from a light source and reflected by an object to be measured to perform range-finding based on a time as a difference between an emission timing and a reception timing of the light.

Figure 1:
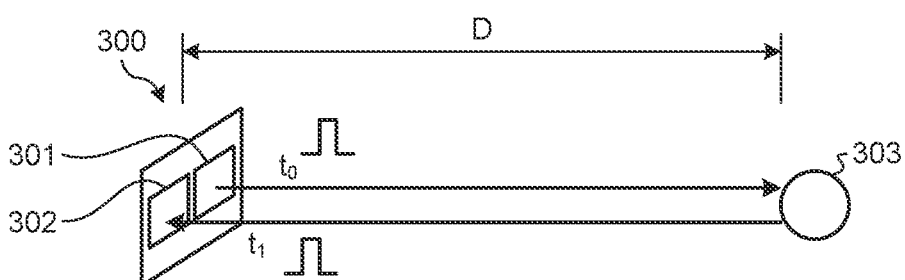
FIG. 1 is a diagram schematically illustrating range-finding using a direct ToF scheme that can be applied to each of embodiments.
Figure 2:
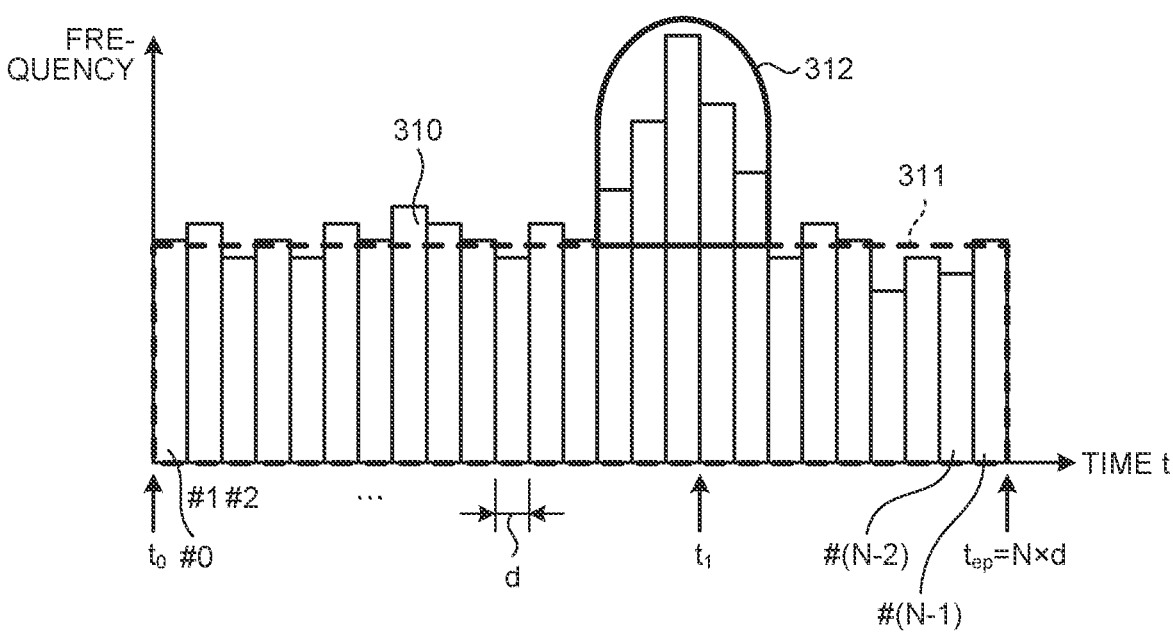
FIG. 2 is a diagram illustrating an exemplary histogram based on a time when a light receiving unit receives light that can be applied to each of the embodiments.

The following briefly describes range-finding using the direct ToF scheme with reference to FIG. 1 and FIG. 2. FIG. 1 is a diagram schematically illustrating range-finding using the direct ToF scheme that can be applied to each of the embodiments. A range-finding device 300 includes a light source unit 301 and a light receiving unit 302. The light source unit 301 is, for example, a laser diode, and driven to emit laser light in a pulse form. Light emitted from the light source unit 301 is reflected by an object to be measured 303, and received by the light receiving unit 302 as reflected light. The light receiving unit 302 includes a light receiving element for converting light into an electric signal by photoelectric conversion, and outputs a signal corresponding to the received light.

A time when the light source unit 301 emits light (light emission timing) is assumed to be a time to, and a time when the light receiving unit 302 receives the reflected light that is emitted from the light source unit 301 and reflected by the object to be measured 303 (light reception timing) is assumed to be a time $t_1$. Assuming that a constant c is a light velocity (2.9979-10$^8$ [m/sec]), a distance D between the range-finding device 300 and the object to be measured 303 is calculated by the following expression (1).

$$D=(c/2)\times(t_1-t_0) \tag{1}$$

The range-finding device 300 repeatedly performs the processing described above multiple times. The light receiving unit 302 may include a plurality of light receiving elements, and the distance D may be calculated based on each light reception timing when the reflected light is received by each of the light receiving elements. The range-finding device 300 classifies a time $t_m$ (referred to as a light reception time $t_m$) from the time $t_0$ as the light emission timing to the light reception timing when the light is received by the light receiving unit 302 based on classes (bins), and generates a histogram.

The light received by the light receiving unit 302 at the light reception time $t_m$ is not limited to the reflected light that is emitted from the light source unit 301 and reflected by the object to be measured. For example, ambient light around the range-finding device 300 (light receiving unit 302) is also received by the light receiving unit 302.

FIG. 2 is a diagram illustrating an exemplary histogram based on the time when the light receiving unit 302 receives light that can be applied to each of the embodiments. In FIG. 2, a horizontal axis indicates the bin, and a vertical axis indicates a frequency of each bin. The bin is obtained by classifying the light reception time $t_m$ for each predetermined unit time d. Specifically, a bin #0 is represented as $0 \le t_m < d$, a bin #1 is represented as $d \le t_m < 2\times d$, a bin #2 is represented as $2 \times d \le t_m < 3\times d$, . . . , and a bin #(N–2) is represented as $(N-2) \times d \le t_m < (N-1) \times d$. Assuming that an exposure time of the light receiving unit 302 is time $t_{ep}$, $t_{ep} = N \times d$ is established.

The range-finding device 300 counts the number of times when the light reception time $t_m$ is acquired based on the bins, and obtains a frequency 310 for each bin to generate the histogram. The light receiving unit 302 also receives light other than the reflected light that is emitted from the light source unit 301 to be reflected. Examples of such light as a target other than the reflected light includes ambient light described above. In the histogram, a portion represented as a range 311 includes an ambient light component of ambient light. Ambient light is light that is randomly incident on the light receiving unit 302, and becomes noise against the reflected light as a target.

On the other hand, the reflected light as a target is light to be received in accordance with a specific distance, and appears as an active light component 312 in the histogram. The bin corresponding to a peak frequency in the active light component 312 is the bin corresponding to the distance D to the object to be measured 303. By acquiring a representative time of the bin (for example, a time in the middle of the bin) as the time $t_1$ described above, the range-finding device 300 can calculate the distance D to the object to be measured 303 in accordance with the expression (1) described above. In this way, by using a plurality of light reception results, appropriate range-finding can be performed against random noise.

Figure 3:
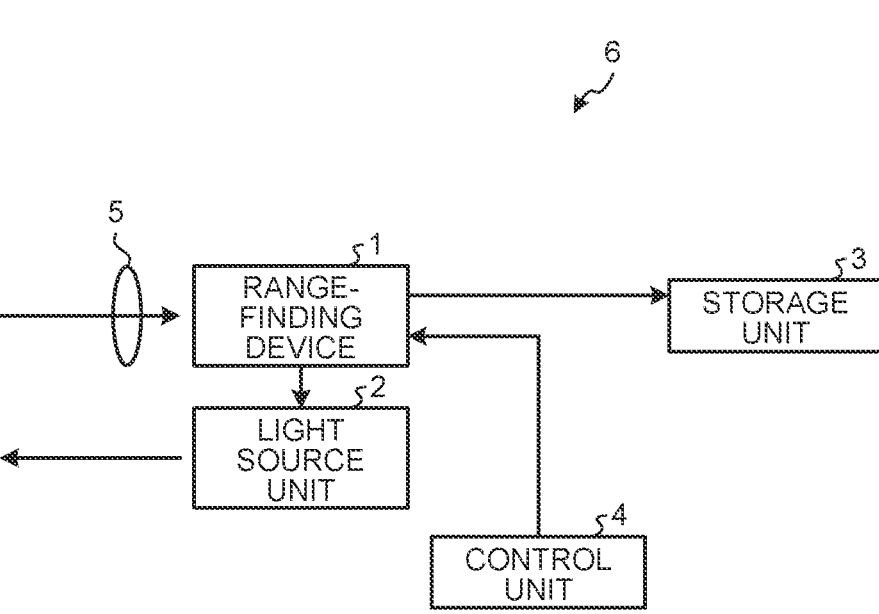
FIG. 3 is a block diagram illustrating an exemplary configuration of an electronic appliance using a range-finding device according to each of the embodiments.

FIG. 3 is a block diagram illustrating an exemplary configuration of an electronic appliance using the range-finding device according to each of the embodiments. In FIG. 3, an electronic appliance 6 includes a range-finding device 1, a light source unit 2, a storage unit 3, a control unit 4, and an optical system 5.

The light source unit 2 corresponds to the light source unit 301 described above, and is a laser diode to be driven to emit laser light in a pulse form, for example. As the light source unit 2, a Vertical Cavity Surface Emitting LASER (VCSEL) that emits laser light as a surface light source can be applied. The embodiment is not limited thereto, and a configuration of using an array in which laser diodes are arranged on a line to scan laser light emitted from the laser diode array in a direction vertical to the line may be applied as the light source unit 2. Additionally, a configuration of using a laser diode as a single light source to scan laser light emitted from the laser diode in a horizontal direction and a vertical direction can be applied.

The range-finding device 1 corresponds to the light receiving unit 302 described above, and includes a plurality of light receiving elements. The light receiving elements are arranged in a two-dimensional lattice shape, for example, and form a light receiving surface. The optical system 5 guides light incident from the outside to the light receiving surface included in the range-finding device 1.

The control unit 4 controls an operation of the entire electronic appliance 6. For example, the control unit 4 supplies, to the range-finding device 1, a light emission trigger as a trigger for causing the light source unit 2 to emit light. The range-finding device 1 causes the light source unit 2 to emit light at a timing based on the light emission trigger, and stores a time $t_{em}$ indicating the light emission timing. The control unit 4 also sets a pattern for range-finding to the range-finding device 1 in response to an instruction from the outside, for example.

The range-finding device 1 counts the number of times of acquiring time information (light reception time $t_m$) indicating the timing when light is received by the light receiving surface within a predetermined time range, and obtains the frequency for each bin to generate the histogram described above. The range-finding device 1 also calculates the distance D to the object to be measured based on the generated histogram. The information indicating the calculated distance D is stored in the storage unit 3.

Figure 4:
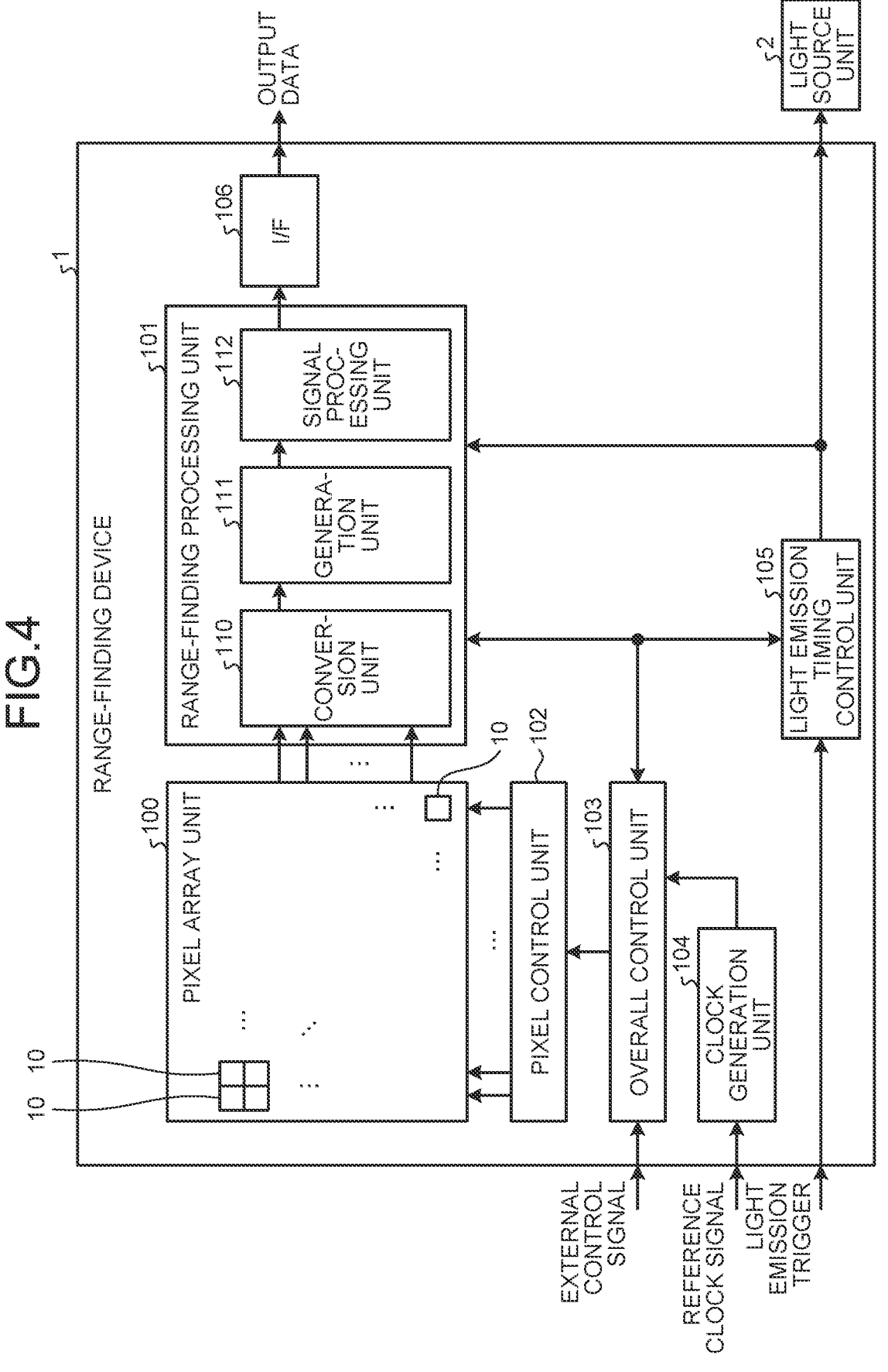
FIG. 4 is a block diagram more specifically illustrating an exemplary configuration of the range-finding device that can be applied to each of the embodiments.

FIG. 4 is a block diagram more specifically illustrating an exemplary configuration of the range-finding device 1 that can be applied to each of the embodiments. In FIG. 4, the range-finding device 1 includes a pixel array unit 100, a range-finding processing unit 101, a pixel control unit 102, an overall control unit 103, a clock generation unit 104, a light emission timing control unit 105, and an interface (I/F) 106. The pixel array unit 100, the range-finding processing unit 101, the pixel control unit 102, the overall control unit 103, the clock generation unit 104, the light emission timing control unit 105, and the I/F 106 can be disposed on one semiconductor chip.

Alternatively, the range-finding device 1 may have a configuration in which a first semiconductor chip and a second semiconductor chip are laminated. In this case, for example, the configuration may be made such that part of the pixel array unit 100 (the light receiving unit and the like) is disposed on the first semiconductor chip, and the other portions included in the range-finding device 1 are disposed on the second semiconductor chip.

In FIG. 4, the overall control unit 103 controls the operation of the entire range-finding device 1 in accordance with a computer program incorporated therein in advance, for example. The overall control unit 103 can also perform control in accordance with an external control signal supplied from the outside. The clock generation unit 104 generates one or more clock signals to be used in the range-finding device 1 based on a reference clock signal supplied from the outside. The light emission timing control unit 105 generates a light emission control signal indicating the light emission timing in accordance with a light emission trigger signal supplied from the outside. The light emission control signal is supplied to the light source unit 2, and supplied to the range-finding processing unit 101.

The pixel array unit 100 includes a plurality of pixels 10, 10, . . . that are arranged in a two-dimensional lattice shape and each include a light receiving element. An operation of each of the pixels 10 is controlled by the pixel control unit 102 following an instruction from the overall control unit 103. For example, the pixel control unit 102 can control readout of a pixel signal from each of the pixels 10 for each block including (p×q) pixels 10, that is, p pixels in a row direction and q pixels in a column direction. The pixel control unit 102 can also scan the pixels 10 in the row direction, and further scan the pixels 10 in the column direction in units of the block to read out the pixel signal from each of the pixels 10. Alternatively, the pixel control unit 102 can control each of the pixels 10 independently. Assuming a predetermined region of the pixel array unit 100 as a target region, the pixel control unit 102 can also assume the pixel 10 included in the target region to be the pixel 10 from which the pixel signal is read out. Furthermore, the pixel control unit 102 can collectively scan a plurality of rows (a plurality of lines), and further scan them in the column direction to read out the pixel signal from each of the pixels 10.

In the following description, scanning is assumed to be processing of causing the light source unit 2 to emit light, and continuously reading out a signal Vpls corresponding to light reception from the pixel 10 for each of the pixels 10 designated as a scanning target in one scanning region. In one time of scanning, light emission and readout can be performed multiple times.

The pixel signal read out from each of the pixels 10 is supplied to the range-finding processing unit 101. The range-finding processing unit 101 includes a conversion unit 110, a generation unit 111, and a signal processing unit 112.

The pixel signal that is read out from each of the pixels 10 and output from the pixel array unit 100 is supplied to the conversion unit 110. The pixel signal is read out from each of the pixels 10 in an asynchronous manner, and supplied to the conversion unit 110. That is, the pixel signal is read out from the light receiving element to be output in accordance with the timing when light is received by each of the pixels 10.

The conversion unit 110 converts the pixel signal supplied from the pixel array unit 100 into digital information. That is, the pixel signal supplied from the pixel array unit 100 is output in accordance with the timing when light is received by the light receiving element included in the pixel 10 corresponding to the pixel signal. The conversion unit 110 converts the supplied pixel signal into the time information indicating the timing.

The generation unit 111 generates the histogram based on the time information about when the pixel signal is converted by the conversion unit 110. The generation unit 111 counts the time information based on the unit time d set by a setting unit 113 to generate the histogram. Details about histogram generation processing performed by the generation unit 111 will be described later.

The signal processing unit 112 performs predetermined arithmetic processing based on data of the histogram generated by the generation unit 111 to calculate distance information, for example. For example, the signal processing unit 112 creates a curve approximation of the histogram based on the data of the histogram generated by the generation unit 111. The signal processing unit 112 can detect a peak of a curve obtained by approximating the histogram, and obtain the distance D based on the detected peak.

In performing curve approximation for the histogram, the signal processing unit 112 can perform filter processing on the curve obtained by approximating the histogram. For example, the signal processing unit 112 can suppress a noise component by performing low-pass filter processing on the curve obtained by approximating the histogram.

The distance information obtained by the signal processing unit 112 is supplied to the interface 106. The interface 106 outputs the distance information supplied from the signal processing unit 112 to the outside as output data. As the interface 106, for example, a Mobile Industry Processor Interface (MIPI) can be applied.

In the above description, the distance information obtained by the signal processing unit 112 is output to the outside via the interface 106, but the embodiment is not limited to this example. That is, the configuration may be made such that histogram data as the data of the histogram generated by the generation unit 111 is output to the outside via the interface 106. In this case, information indicating a filter coefficient can be omitted from range-finding condition information set by the setting unit 113. The histogram data output from the interface 106 is supplied to an external information processing device, for example, and processed as appropriate.

Figure 5:
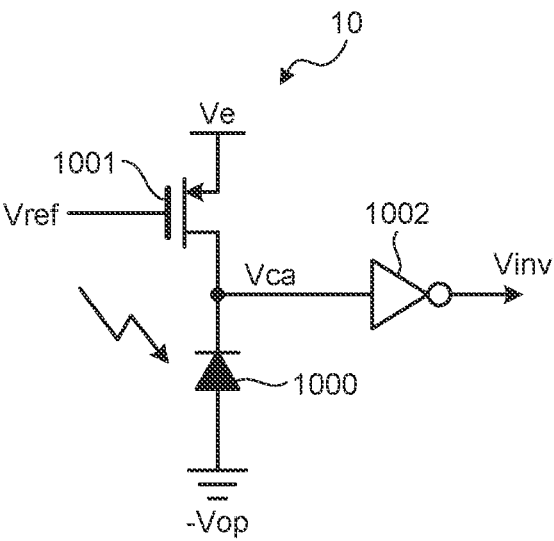
FIG. 5 is a diagram illustrating a basic configuration example of a pixel that can be applied to each of the embodiments.

FIG. 5 is a diagram illustrating a basic configuration example of the pixel 10 that can be applied to each of the embodiments. In FIG. 5, the pixel 10 includes a light receiving element 1000, a transistor 1001 as a P-channel MOS transistor, and an inverter 1002.

The light receiving element 1000 converts incident light into an electric signal to be output by photoelectric conversion. In each of the embodiments, the light receiving element 1000 converts an incident photon (photon) into an electric signal by photoelectric conversion, and outputs a pulse corresponding to incidence of the photon. In each of the embodiments, a single photon avalanche diode is used as the light receiving element 1000. In the following description, the single photon avalanche diode is referred to as an SPAD. The SPAD has a characteristic such that, when a large negative voltage that causes avalanche multiplication is applied to a cathode, an electron generated in accordance with incidence of one photon causes avalanche multiplication, and a large current flows. By using the characteristic of the SPAD, incidence of one photon can be detected with high sensitivity.

In FIG. 5, in the light receiving element 1000 as the SPAD, a cathode is connected to a drain of the transistor 1001, and an anode is connected to a voltage source of a negative voltage (−Vop) corresponding to a voltage Vbd as a breakdown voltage of the light receiving element 1000. A source of the transistor 1001 is connected to an excessive bias voltage Ve. A reference voltage Vref is input to a gate of the transistor 1001. The transistor 1001 is a current source that outputs a current corresponding to the excessive bias voltage Ve and the reference voltage Vref through the drain. With this configuration, a reverse bias is applied to the light receiving element 1000. A photoelectric current flows in a direction from the cathode of the light receiving element 1000 toward the anode.

More specifically, in the light receiving element 1000, when the excessive bias voltage Ve is applied to the cathode, and a photon is incident thereon in a state in which a voltage $V_{CTH-AN}$ between the cathode and the anode is a voltage VDD+Vop, avalanche multiplication is started, the current flows in the direction from the cathode toward the anode, and a voltage drop is caused in the light receiving element 1000 accordingly. When the voltage $V_{CTH-AN}$ between the cathode and the anode of the light receiving element 1000 drops to the voltage Vop because of the voltage drop, avalanche multiplication is stopped (quenching operation). Thereafter, the light receiving element 1000 is charged by the current (recharge current) from the transistor 1001 as a current source, and the state of the light receiving element 1000 returns to a state before the photon is incident (recharge operation).

A voltage Vca taken out from a connection point of the drain of the transistor 1001 and the cathode of the light receiving element 1000 is input to the inverter 1002. The inverter 1002 performs threshold determination for the input voltage Vca based on a threshold voltage Vth, and inverts a signal Vinv to be output every time the voltage Vca exceeds the threshold voltage Vth in a positive direction or a negative direction.

More specifically, the inverter 1002 inverts the signal Vinv at a first timing when the voltage Vca exceeds the threshold voltage Vth in the voltage drop caused by avalanche multiplication corresponding to incidence of the photon on the light receiving element 1000. Next, the light receiving element 1000 is charged by the recharge operation, and the voltage Vca rises. The inverter 1002 inverts the signal Vinv again at a second timing when the rising voltage Vca exceeds the threshold voltage Vth. A width in a time direction between the first timing and the second timing is an output pulse corresponding to incidence of the photon on the light receiving element 1000.

The output pulse corresponds to the pixel signal that is output from the pixel array unit 100 in an asynchronous manner as described above with reference to FIG. 4. In FIG. 4, the conversion unit 110 converts the output pulse into time information indicating a timing when the output pulse is supplied, and passes the time information to the generation unit 111. The generation unit 111 generates the histogram based on the time information.

Figure 6:
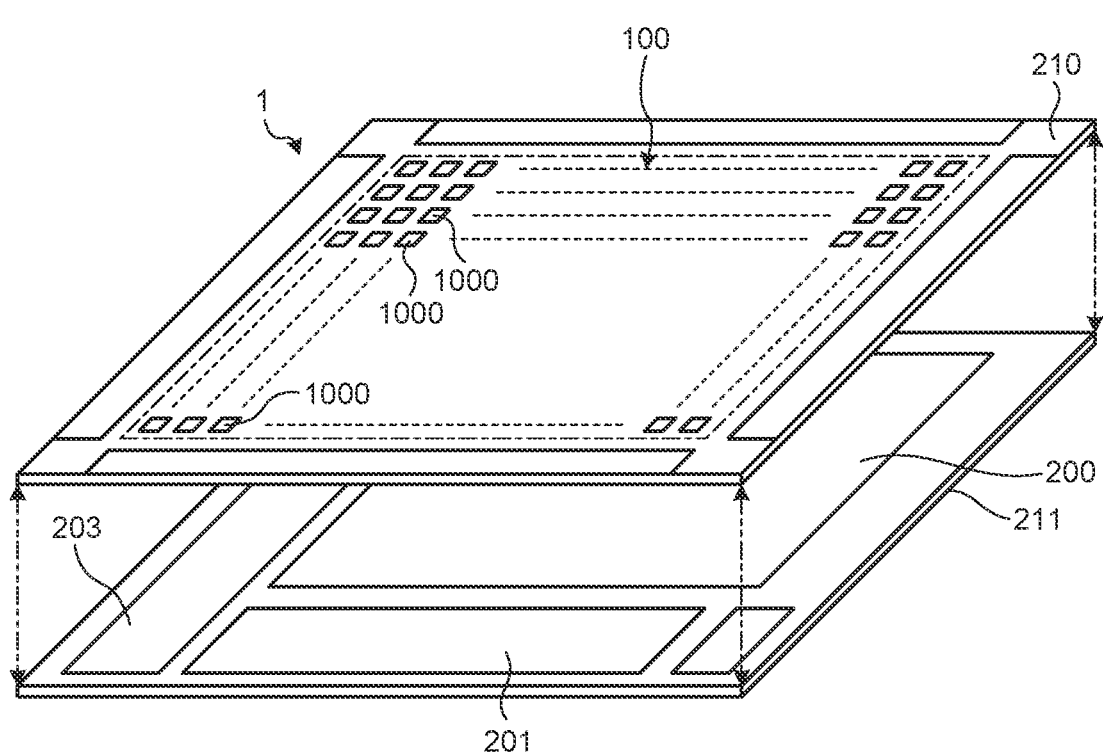
FIG. 6 is a schematic diagram illustrating an example of a configuration of a device that can be applied to the range-finding device according to each of the embodiments.

FIG. 6 is a schematic diagram illustrating an example of a configuration of a device that can be applied to the range-finding device 1 according to each of the embodiments. In FIG. 6, the range-finding device 1 is configured by laminating a first chip 210 and a second chip 211 each constituted of a semiconductor chip. For explanation, FIG. 5 illustrates the first chip 210 and the second chip 211 in a separated state. In the following description, for convenience' sake, the first chip 210 is referred to as an upper chip 210, and the second chip 211 is referred to as a lower chip 211.

On the upper chip 210, light receiving elements 1000 included in the respective pixels 10 are arranged in a two-dimensional lattice shape in the region of the pixel array unit 100. In the pixel 10, the transistor 1001 and the inverter 1002 are formed on the lower chip 211. Both ends of the light receiving element 1000 are connected between the upper chip 210 and the lower chip 211 via a coupling part 1105 by Copper-Copper Connection (CCC), for example.

A logic array unit 200 including a signal processing unit for processing a signal acquired by the light receiving element 1000 is disposed on the lower chip 211. A signal processing circuit unit 201 for processing a signal acquired by the light receiving element 1000, and a device control unit 203 for controlling an operation of the range-finding device 1 can be further disposed in the vicinity of the logic array unit 200 on the lower chip 211.

For example, the signal processing circuit unit 201 can include the range-finding processing unit 101 described above. The device control unit 203 can include the pixel control unit 102, the overall control unit 103, the clock generation unit 104, the light emission timing control unit 105, and the interface 106 described above.

The configurations on the upper chip 210 and the lower chip 211 are not limited to this example. The device control unit 203 can also be disposed for the purpose of drive or control other than the control of the logic array unit 200 in the vicinity of the light receiving element 1000, for example. In addition to the disposition illustrated in FIG. 6, the device control unit 203 can be disposed to have an optional function in an optional region of the upper chip 210 and the lower chip 211.

Example of Control of Light Receiving Element Using Existing Technique

Figure 7:
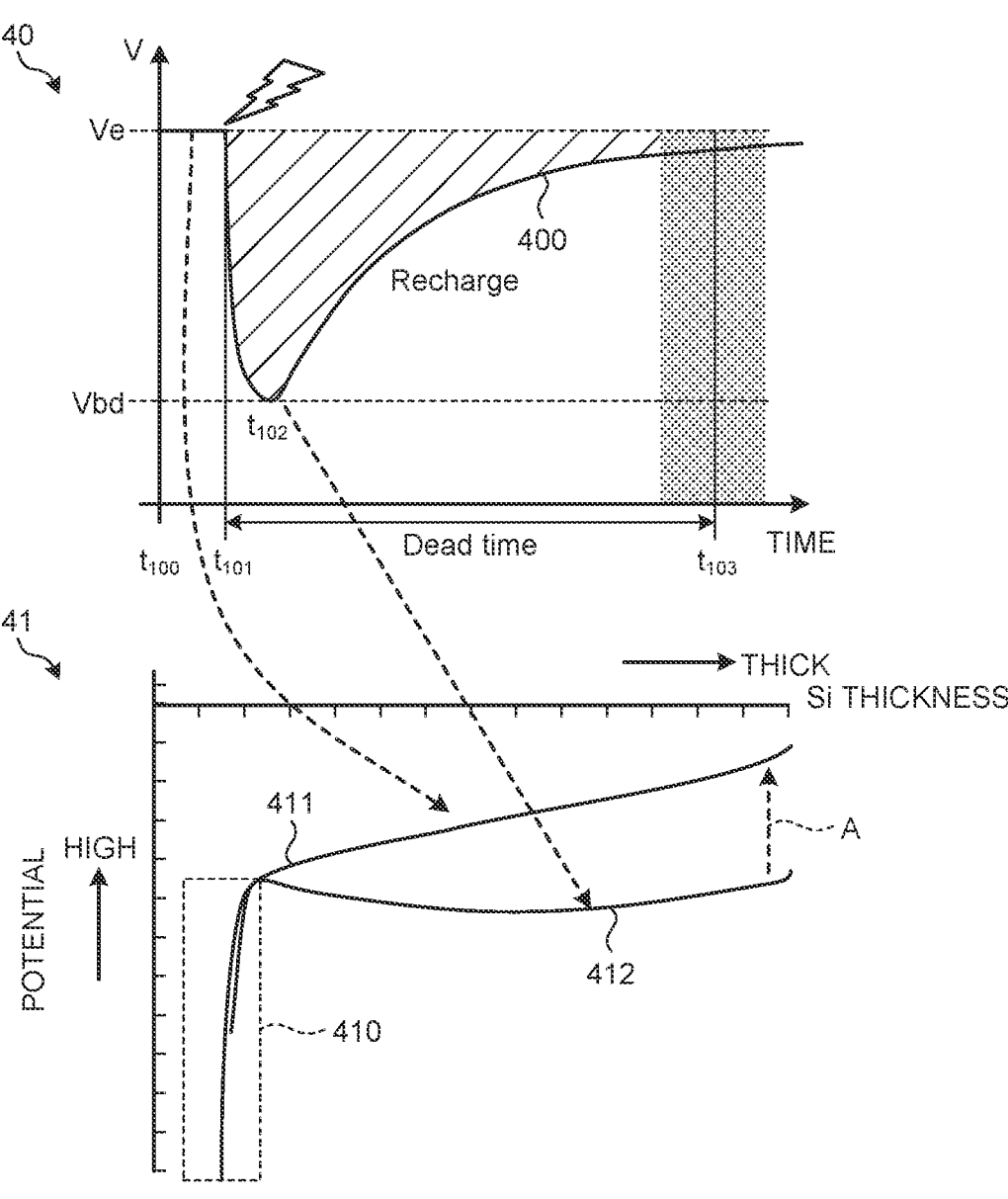
FIG. 7 is a diagram briefly illustrating an operation of a light receiving element as an SPAD.

Next, before describing the technique according to the present disclosure, to facilitate understanding, the following describes an example of control of the light receiving element 1000 using an existing technique. FIG. 7 is a diagram briefly illustrating an operation of the light receiving element 1000 as the SPAD. In a chart 40 on an upper row in FIG. 7, a characteristic line 400 indicates an example of variation in the voltage $V_{CTH-AN}$ between the cathode and the anode of the light receiving element 1000, a vertical axis indicates the voltage [V], and a horizontal axis indicates the time.

A chart 41 on a lower row in FIG. 7 illustrates an example of variation in a potential of the light receiving element 1000 in a silicon (Si) substrate, a vertical axis indicates the potential, and a horizontal axis indicates a thickness direction (Si thickness) of the substrate. The chart 41 is related to behavior of electrons, and the potential is increased in an upward direction of the vertical axis.

First, the following describes a basic operation example of the light receiving element 1000 with reference to the chart 40. Herein, used is a configuration in which a resistance element having a resistance value Rq is connected instead of the transistor 1001 in the circuit configuration described above with reference to FIG. 5. At a time $t_{100}$, a voltage obtained by adding the excessive bias voltage Ve to the voltage Vbd as a breakdown voltage is applied between the cathode and the anode of the light receiving element 1000, and the light receiving element 1000 is caused to be in a standby state for incidence of a photon. In the standby state, a current does not flow from the cathode toward the anode in the light receiving element 1000.

When a photon is incident on the light receiving element 1000 in the standby state at a time $t_{101}$, for example, avalanche multiplication is caused by the incident photon, and a current flows from the cathode toward the anode of the light receiving element 1000. Due to this, a voltage drop is caused in the resistance element that is connected to the light receiving element 1000 in series, and the voltage $V_{CTH-AN}$ of the light receiving element 1000 drops. When the voltage $V_{CTH-AN}$ drops to the voltage Vbd as a breakdown voltage, avalanche multiplication is stopped in the light receiving element 1000 (time $t_{102}$, the quenching operation). Thereafter, the light receiving element 1000 is charged by the current supplied via the resistance element (recharge operation), and the voltage $V_{CTH-AN}$ comes closer to the excessive bias voltage Ve as indicated by the characteristic line 400 in the chart 40.

A time from the time $t_{101}$ when the photon is incident on the light receiving element 1000 to a time $t_{103}$ when the voltage $V_{CTH-AN}$ rises to a predetermined voltage by the recharge operation is a time required for resetting the light receiving element 1000, and is called a dead time. The light receiving element 1000 does not cause avalanche multiplication even when a photon is incident thereon during a dead time period.

A multiplication region 410 of the light receiving element 1000 is illustrated on a left end side of the chart 41 in FIG. 7, and a direction from the multiplication region 410 toward a right direction indicates coming closer to the light receiving surface. The multiplication region 410 has a characteristic in which the potential is abruptly increased with respect to a change of the thickness. Characteristic lines 411 and 412 in the chart 41 indicate examples of a potential curve representing variation in the potential in the thickness direction.

In a period from the time $t_{100}$ to the time $t_{101}$ illustrated as the standby state in the chart 40, as exemplified as the characteristic line 411 in the chart 41, the potential is increased as coming closer to the light receiving surface from the multiplication region 410. On the other hand, when avalanche multiplication is caused in the light receiving element 1000 and the quenching operation is started, the excessive bias voltage Ve drops, so that, as exemplified as the characteristic line 412 in the chart 41, a section in which the potential is reduced is generated in a process of coming closer to the light receiving surface from the multiplication region 410. The potential is reduced the most at a certain thickness, and is gently increased toward the light receiving surface from the thickness. Hereinafter, a hollow of the potential curve due to reduction and increase of the potential is referred to as "deflection of the potential". The deflection of the potential is gradually resolved by the recharge operation as indicated by an arrow A in the chart 41.

Figure 8A:
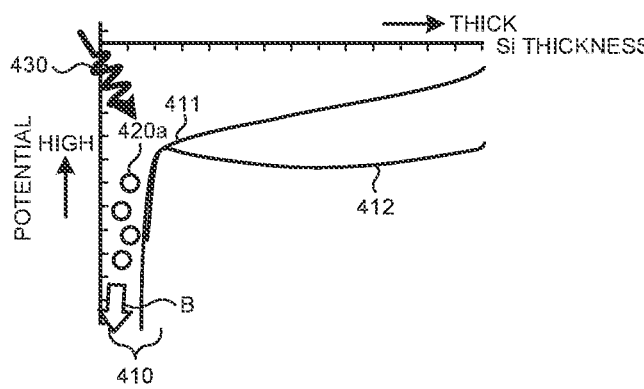
FIG. 8A is a diagram for briefly explaining afterpulsing occurring in the light receiving element.
Figure 8B:
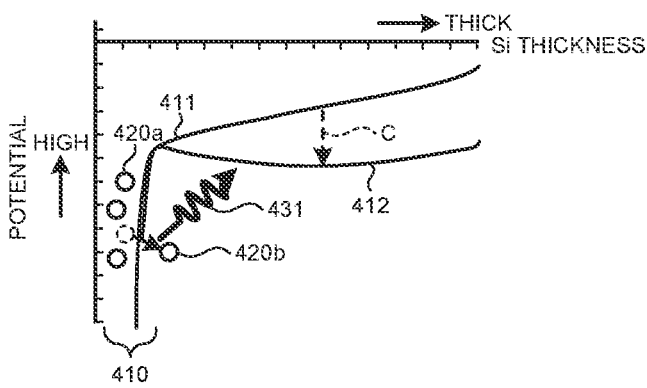
FIG. 8B is a diagram for briefly explaining afterpulsing occurring in the light receiving element.

Next, the following briefly describes afterpulsing caused in the light receiving element 1000 with reference to FIG. 8A to FIG. 8D. FIG. 8A to FIG. 8D correspond to the chart 41 in FIG. 7 described above. FIG. 8A is a diagram illustrating a state in which avalanche multiplication is started because of arrival of a photon or a dark current in the light receiving element 1000. When a photon 430 arrives at the light receiving element 1000 in the standby state, avalanche multiplication is caused, and as indicated by an arrow B, an electron 420a moves, while accelerating, along the characteristic line 411 that abruptly changes in the multiplication region 410. The state in FIG. 8A corresponds to a state in the vicinity of the time $t_{101}$ in the chart 40 in FIG. 7 described above, for example.

When avalanche multiplication is caused, and the current flows from the cathode toward the anode in the light receiving element 1000, the voltage $V_{CTH-AN}$ drops. Due to this, the state of the potential curve is changed from the characteristic line 411 to the characteristic line 412, and deflection is caused in the potential. As exemplified as an electron 420b that moves across the characteristic line 411 in the multiplication region 410 in FIG. 8B, when only part of carriers contributing to avalanche multiplication is trapped by an Si interface, light emission 431 is caused in the light receiving element 1000.

Figure 8C:
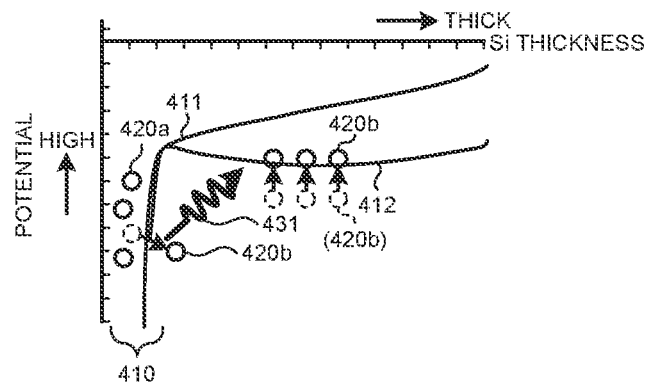
FIG. 8C is a diagram for briefly explaining afterpulsing occurring in the light receiving element.

As illustrated in FIG. 8C, electrons 420*b* accumulate on the deflection of the potential because of the light emission 431 inside the element. That is, a deflected portion of the potential is a hollow in which the potential is lower than that of thicknesses on both sides thereof, and the electrons 420*b* accumulate on the hollow. These states in FIG. 8B and FIG. 8C correspond to a state in the vicinity of the time $t_{102}$ in the chart 40 in FIG. 7, for example.

Figure 8D:
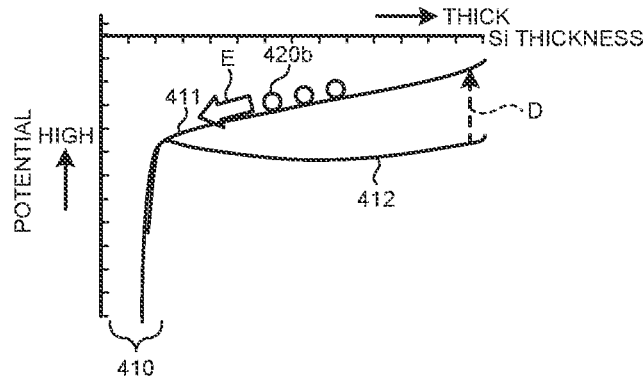
FIG. 8D is a diagram for briefly explaining afterpulsing occurring in the light receiving element.

When the deflection of the potential is resolved by the recharge operation, as indicated by an arrow D in FIG. 8D, the potential curve is changed from the state of the characteristic line 412 to the state of the characteristic line 411. Due to this, the electron 420*a* in the multiplication region 410 is discharged from the light receiving element 1000. This state corresponds to a state in the vicinity of the time $t_{103}$ in the chart 40 in FIG. 7, for example.

In the state of FIG. 8D, as indicated by an arrow E in FIG. 8D, the electrons 420*b* accumulated on the deflection of the potential move along the potential curve indicated by the characteristic line 411. When the moved electron 420*b* reaches the multiplication region 410, avalanche multiplication is started again by the electron 420*b*. That is, in the light receiving element 1000, avalanche multiplication is caused and the current flows even without arrival of a photon.

At this point, as illustrated in FIG. 8C, performed is processing of discharging, from the light receiving element 1000, the electrons 420*b* accumulated on the deflected portion of the potential before avalanche multiplication is caused by afterpulsing. For example, the electrons 420*b* are discharged during the recharge operation. In this case, by reducing a current value of the recharge current, a time until the recharge operation is completed is prolonged, and the electrons 420*b* can be discharged more securely. On the other hand, when the time of the recharge operation is prolonged, the dead time is prolonged, and a reaction speed of the light receiving element 1000 to incidence of a photon is lowered.

First Embodiment

Next, the following describes a first embodiment of the present disclosure. In the first embodiment, a power supply voltage VDD corresponding to the excessive bias voltage Ve is applied to the cathode of the light receiving element 1000 in accordance with inversion of an output of the inverter 1002 based on the signal Vpls output from the light receiving element 1000, and the voltage of the cathode is forcibly raised to the voltage VDD. At the same time, the current value of the recharge current is caused to be a smaller current value than a current value of a recharge current used in an existing technique to moderate restoration of the voltage of the cathode to the power supply voltage VDD. Due to this, the electrons accumulated on the deflected portion of the potential can be discharged more securely without prolonging the time required for the recharge operation.

In the following description, unless specifically noted, representation such as "the current value of the current is small (large)" is abbreviated as "the current is small (large)".

Figure 9:
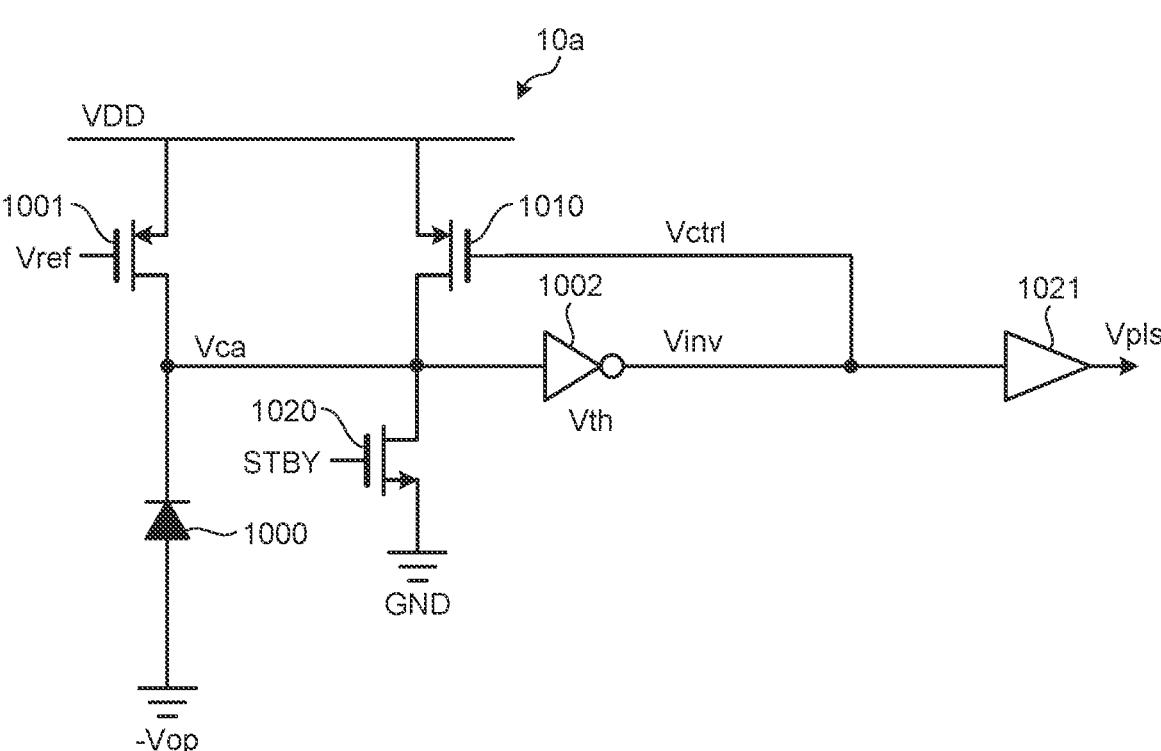
FIG. 9 is a diagram illustrating an exemplary configuration of a pixel according to a first embodiment.

FIG. 9 is a diagram illustrating an exemplary configuration of the pixel according to the first embodiment. In FIG. 9, a pixel 10*a* includes the light receiving element 1000 as the SPAD, the transistor 1001 as a P-channel MOS transistor, the inverter 1002, a transistor 1010 as a P-channel MOS transistor, and a transistor 1020 as an N-channel MOS transistor. The pixel 10*a* may also include a buffer circuit 1021.

In FIG. 9, the light receiving element 1000, the transistor 1001, and the inverter 1002 are connected similarly to the configuration in FIG. 5 described above. That is, the cathode of the light receiving element 1000 is connected to the drain of the transistor 1001, and the anode thereof is connected to the power supply of the negative voltage (–Vop). The negative voltage (–Vop) corresponds to a negative voltage (–Vbp) in FIG. 5, and is a voltage corresponding to the breakdown voltage of the light receiving element 1000. The source of the transistor 1001 is connected to a supply line of the power supply voltage VDD. The power supply voltage VDD corresponds to the excessive bias voltage Ve in FIG. 5.

In the following description, unless specifically noted, representation such as "connected to the supply line of the power supply voltage VDD" is described as "connected to the power supply voltage VDD".

The reference voltage Vref is input to the gate of the transistor 1001. The transistor 1001 is a current source that outputs, through the drain, the current corresponding to the power supply voltage VDD (excessive bias voltage Ve) and the reference voltage Vref. For example, the transistor 1001 is a transistor as a replication destination in the current mirror circuit, and a current flowing between the source and the drain of a transistor as a replication source in the current mirror circuit (not illustrated) is replicated to be output through the drain.

The voltage Vca taken out from the connection point to which the drain of the transistor 1001 and the cathode of the light receiving element 1000 are connected is input to the inverter 1002. The inverter 1002 performs, for example, determination for the input voltage Vca, and outputs the signal Vinv that is inverted every time the voltage Vca exceeds the threshold voltage Vth in the positive direction or the negative direction. The signal Vinv output from the inverter 1002 is output as the signal Vpls via the buffer circuit 1021, for example.

A drain of the transistor 1010 and a drain of the transistor 1020 are also connected to the connection point to which the drain of the transistor 1001 and the cathode of the light receiving element 1000 are connected. A source of the transistor 1020 is connected to a ground potential GND, and a signal STBY is input to a gate thereof. The signal STBY is caused to be in a High state, a part between the drain and the source of the transistor 1020 is caused to be in an ON state, and the voltage Vca of the cathode of the light receiving element 1000 is forced to be the ground potential. Due to this, an avalanche multiplication reaction is prevented from being easily caused in the light receiving element 1000 in the standby state.

A source of the transistor 1010 is connected to the power supply voltage VDD. The signal Vinv output from the inverter 1002 is input to a gate of the transistor 1010 as a control signal Vctrl. The transistor 1010 is caused to be in the ON state while the signal Vinv, that is, a signal Vctlr is in a Low state, and the cathode of the light receiving element 1000 is connected to the power supply voltage VDD.

Figure 10:
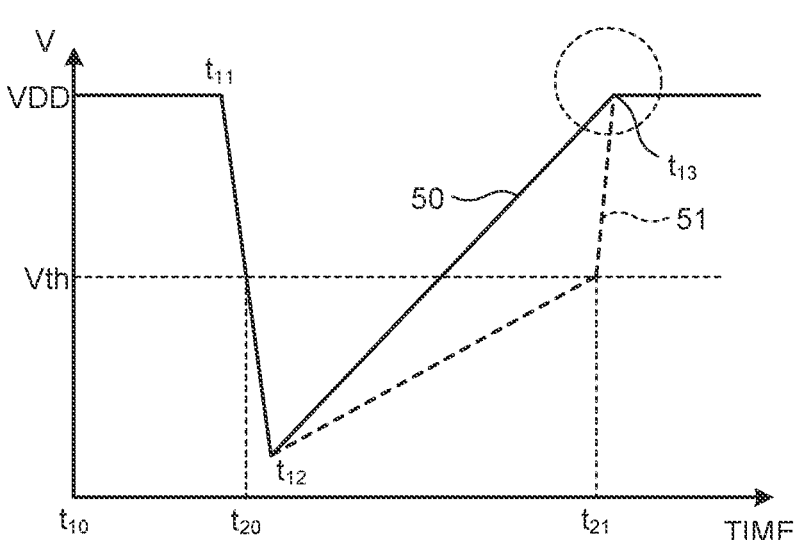
FIG. 10 is a diagram illustrating an example of variation in a voltage Vca of a cathode of the light receiving element in a configuration according to the first embodiment.

FIG. 10 is a diagram illustrating an example of variation in the voltage Vca of the cathode of the light receiving element 1000 in the configuration according to the first embodiment illustrated in FIG. 9. In FIG. 10, a characteristic line 50 indicates the voltage Vca in a case of not applying the first embodiment, and a characteristic line 51 indicates the voltage Vca in a case of applying the first embodiment.

In FIG. 10, a time $t_{10}$ corresponds to the time $t_{100}$ in the chart 40 of FIG. 7, and a voltage obtained by adding the power supply voltage VDD to the breakdown voltage (−Vop) is applied between the cathode and the anode of the light receiving element 1000. The power supply voltage VDD is a voltage corresponding to the excessive bias voltage Ve described above for the light receiving element 1000, and the light receiving element 1000 is in the standby state for incidence of a photon. In this state, the signal Vinv as an output of the inverter 1002 is in the Low state, and the cathode of the light receiving element 1000 is connected to the power supply voltage VDD via the transistor 1010.

When a photon is incident on the light receiving element 1000 in the standby state at a time $t_{11}$, for example, avalanche multiplication is caused by the incident photon. Due to this avalanche multiplication, the current flows from the cathode of the light receiving element 1000 toward the anode, and the voltage Vca of the cathode of the light receiving element 1000 drops.

The voltage Vca taken out from the cathode of the light receiving element 1000 is input to the inverter 1002, and compared with the threshold voltage Vth in the inverter 1002. At a time $t_{20}$, when the voltage Vca exceeds the threshold voltage Vth, the signal Vinv (control signal Vctrl) as an output of the inverter 1002 is inverted to be in the High state, and the transistor 1010 is caused to be in an OFF state.

At time $t_{12}$, the voltage Vca of the cathode of the light receiving element 1000 drops to the voltage (−Vop), and avalanche multiplication is stopped. The current flows into the cathode of the light receiving element 1000 via the transistor 1001, and the recharge operation for the light receiving element 1000 is started.

At this point, by causing the recharge current to be a current smaller than a predetermined current, as exemplified by the characteristic line 51, inclination of rise of the voltage Vca of the cathode caused by the recharge operation can be moderated as compared with a case of not applying the first embodiment (refer to the characteristic line 50). For example, the recharge current is caused to be a smaller current as compared with a case of not applying the technique according to the present disclosure. Due to this, the time until the voltage Vca exceeds the threshold voltage Vth next is prolonged as compared with the case of not applying the technique according to the present disclosure, so that the electrons accumulated on the deflected portion of the potential can be discharged more securely, and afterpulsing can be prevented from being caused.

When the voltage Vca of the cathode of the light receiving element 1000 exceeds the threshold voltage Vth of the inverter 1002 (time $t_{21}$), the signal Vinv as an output of the inverter 1002 is inverted to be in the Low state. When the signal Vinv is caused to be in the Low state, the transistor 1010 is caused to be in the ON state, and the power supply voltage VDD is supplied to the cathode of the light receiving element 1000 via the transistor 1010. Due to this, as indicated by the characteristic line 51 starting from the $time_{21}$ in FIG. 10, the voltage Vca of the cathode of the light receiving element 1000 is forcibly raised to the power supply voltage VDD, and the recharge operation is completed (time $t_{13}$).

In this way, in the first embodiment of the present disclosure, by the operation of the transistor 1010 corresponding to the signal Vinv output from the inverter 1002, supply of the power supply voltage VDD (excessive bias voltage Ve) to the light receiving element 1000 is controlled. Due to this, with the configuration according to the first embodiment, afterpulsing can be prevented from being caused without prolonging the time required for the recharge operation.

In a case in which the transistor 1010 is in the ON state, when a current equal to or larger than a predetermined current flows into the cathode of the light receiving element 1000 via the transistor 1010, energy with which avalanche multiplication can be started may be given to the electron remaining in the light receiving element 1000 to cause afterpulsing. Thus, the current flowing into the light receiving element 1000 in a case in which the transistor 1010 is in the ON state is caused to be smaller than a latching current of the light receiving element 1000. The latching current is a current unique to the light receiving element 1000 that is required for maintaining avalanche multiplication in the light receiving element 1000.

For example, at the time $t_{21}$, the current is supplied from the transistor 1010 to the light receiving element 1000, and the current is also supplied thereto from the transistor 1001. Thus, it can be considered to cause a current obtained by adding the current supplied to the light receiving element 1000 from the transistor 1001 to the current supplied thereto from the transistor 1010 to be a smaller current than the latching current.

For example, by adjusting a size (aspect ratio) of the transistor 1010, the current flowing between the source and the drain of the transistor 1010 can be adjusted. The same applies to the transistor 1001.

First Modification of First Embodiment

Figure 11:
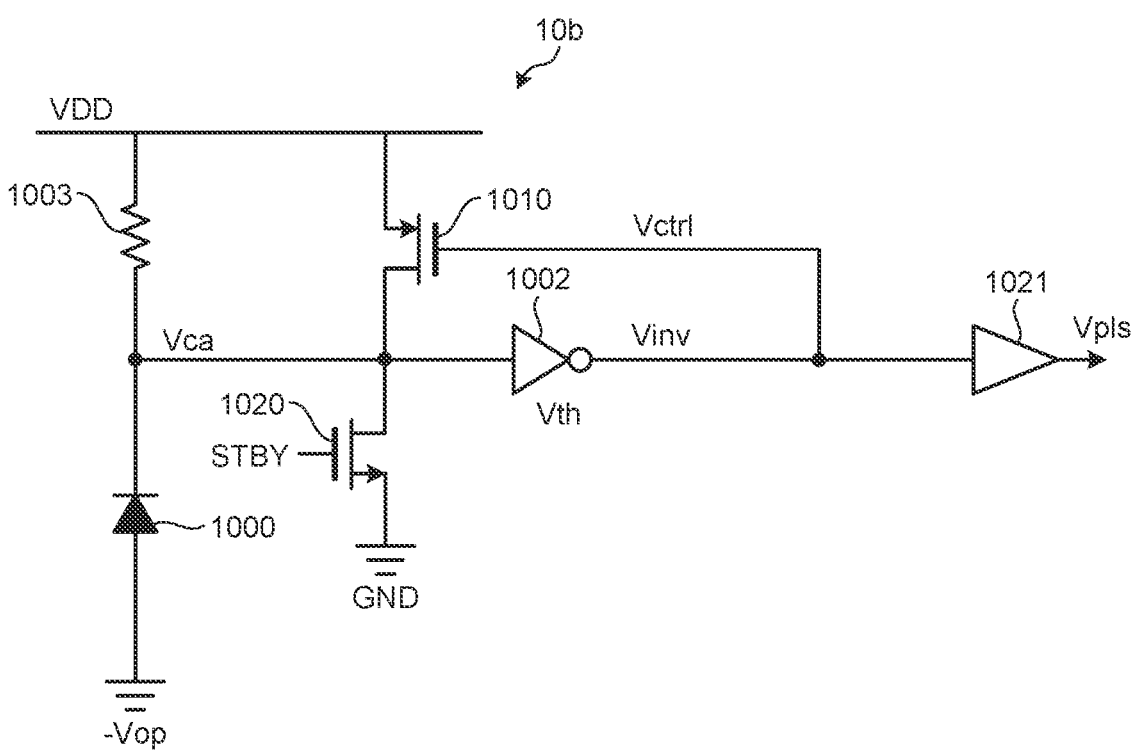
FIG. 11 is a diagram illustrating an exemplary configuration of a pixel according to a first modification of the first embodiment.

Next, the following describes a first modification of the first embodiment of the present disclosure. FIG. 11 is a diagram illustrating an exemplary configuration of a pixel according to the first modification of the first embodiment. In FIG. 11, by way of example, a pixel 10b includes a resistance element 1003 in place of the transistor 1001 as a current source in contrast to the configuration of FIG. 9 described above. Other portions are the same as those in the configuration of FIG. 9 described above, so that detailed description thereof will not be repeated herein.

In a case of the configuration of FIG. 11, in the standby state of the light receiving element 1000, the current does not flow in the resistance element 1003, and the power supply voltage VDD is applied to the cathode of the light receiving element 1000. When avalanche multiplication is caused and the current flows in the light receiving element 1000, a voltage drop is caused in the resistance element 1003. Due to this, the voltage $V_{CTH-AN}$ between the cathode and the anode of the light receiving element 1000 drops, and as a result, avalanche multiplication is stopped.

In a case of this operation, the voltage Vca of the cathode during a period from the time $t_{10}$ to the time $t_{21}$ through the time $t_{11}$ illustrated in FIG. 10 is changed curvedly as illustrated as the characteristic line 400 in the chart 40 of FIG. 7 instead of being linearly changed as illustrated in FIG. 10. When the voltage Vca exceeds the threshold voltage Vth of the inverter 1002 at the time t21 in FIG. 10, the transistor 1010 is caused to be in the ON state, the cathode of the light receiving element 1000 is connected to the power supply voltage VDD, and the voltage Vca is forcibly raised to the power supply voltage VDD.

Also in this configuration of FIG. 11, the current flowing into the light receiving element 1000 in a case in which the transistor 1010 is in the ON state needs to be smaller than the latching current. In a case of the configuration of FIG. 11, by adjusting a size of the transistor 1010 and a resistance value of the resistance element 1003, the current can be made smaller than the latching current.

Second Modification of First Embodiment

Figure 12:
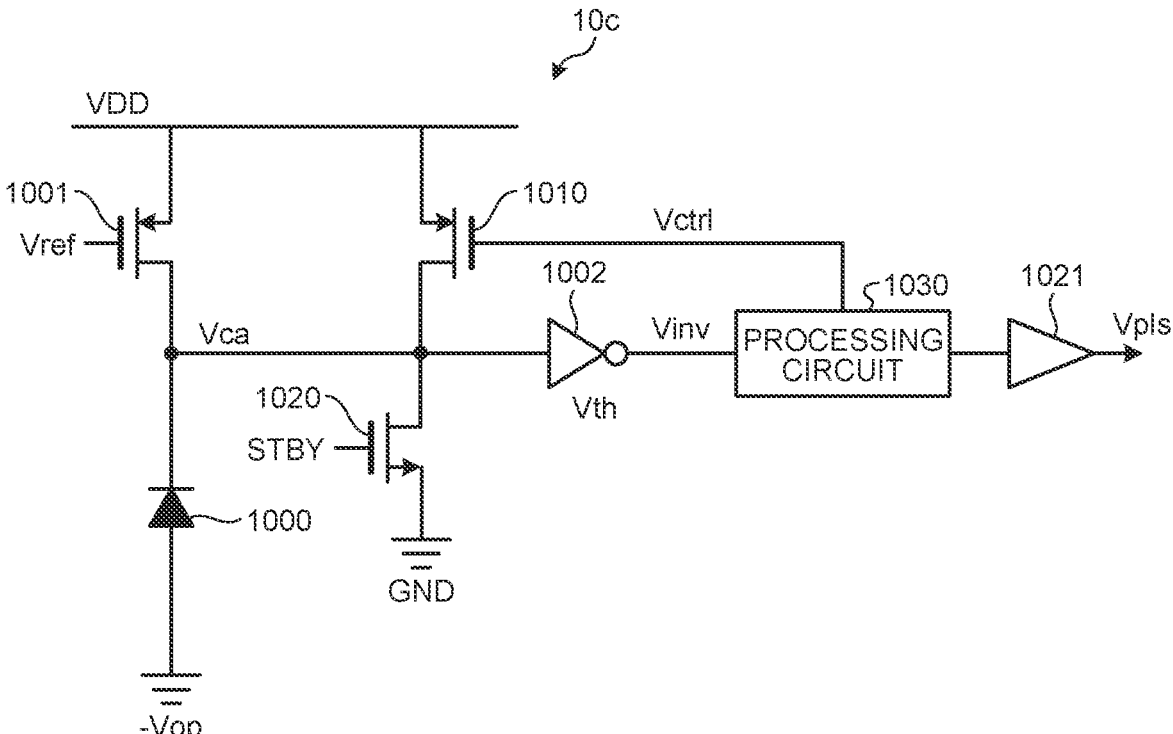
FIG. 12 is a diagram illustrating an exemplary configuration of a pixel according to a second modification of the first embodiment.

Next, the following describes a second modification of the first embodiment. FIG. 12 is a diagram illustrating an exemplary configuration of a pixel according to the second modification of the first embodiment. In FIG. 12, the pixel 10c is obtained by adding a processing circuit 1030 to the pixel 10a illustrated in FIG. 9. Other portions are the same as those in the configuration of FIG. 9 described above, so that detailed description thereof will not be repeated herein.

The signal Vinv output from the inverter 1002 is supplied to the processing circuit 1030. The processing circuit 1030 performs predetermined processing on the signal Vinv to be supplied to the buffer circuit 1021. The buffer circuit 1021 outputs the signal supplied from the processing circuit 1030 as an output signal Vpls'.

The processing circuit 1030 outputs the control signal Vctrl that does not change logic of the input signal Vinv. The control signal Vctrl output from the processing circuit 1030 is input to the gate of the transistor 1010. By supplying the control signal Vctrl to the gate of the transistor 1010 from the processing circuit 1030, the control signal Vctrl that does not change the logic of the signal Vinv output from the inverter 1002, the pixel 10c can operate similarly to the operation described above with reference to FIG. 10.

The processing circuit 1030 can include a buffer circuit, for example. For example, the processing circuit 1030 can perform impedance conversion by the buffer circuit. A circuit included in the processing circuit 1030 is not specifically limited so long as the circuit can output the control signal Vctrl that does not change the logic of the signal Vinv supplied from the inverter 1002.

With the configuration according to the second modification of the first embodiment, it is possible to perform predetermined processing on the signal Vinv output from the inverter 1002 to be output.

Third Modification of First Embodiment

Figure 13:
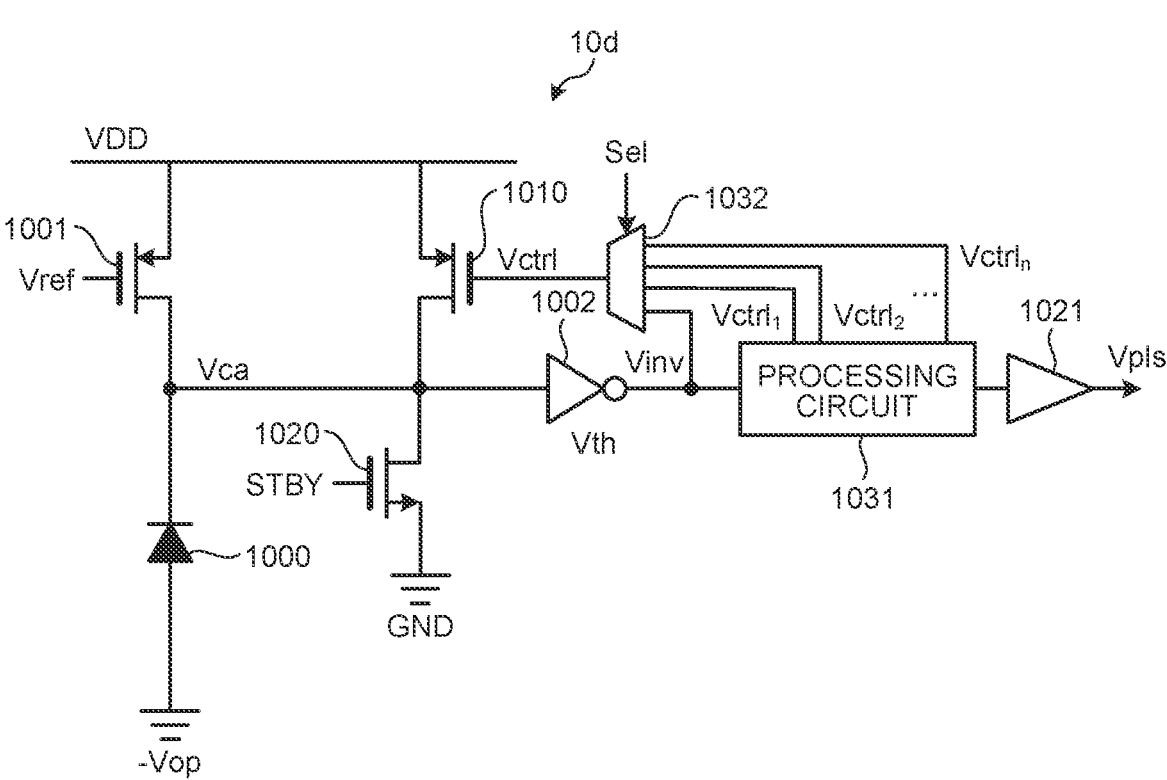
FIG. 13 is a diagram illustrating an exemplary configuration of a pixel according to a third modification of the first embodiment.

Next, the following describes a third modification of the first embodiment. FIG. 13 is a diagram illustrating an exemplary configuration of a pixel according to the third modification of the first embodiment. In FIG. 13, a pixel 10d is obtained by adding a processing circuit 1031 and a selector 1032 to the pixel 10a illustrated in FIG. 9. Other portions are the same as those in the configuration of FIG. 9 described above, so that detailed description thereof will not be repeated herein.

In FIG. 13, the processing circuit 1031 performs predetermined processing on the signal Vinv supplied from the inverter 1002 to be supplied to the buffer circuit 1021. The processing circuit 1031 can output a plurality of control signals $Vctrl_1$, $Vctrl_2$, . . . , and $Vctrl_n$ that do not change the logic of the supplied signal Vinv. The selector 1032 selects one signal from among the control signals $Vctrl_1$, $Vctrl_2$, . . . , and $Vctrl_n$ output from the processing circuit 1031 in accordance with a signal Sel supplied from the outside of the pixel 10d, and inputs the selected signal to the gate of the transistor 1010 as the control signal Vctrl.

Figure 14:
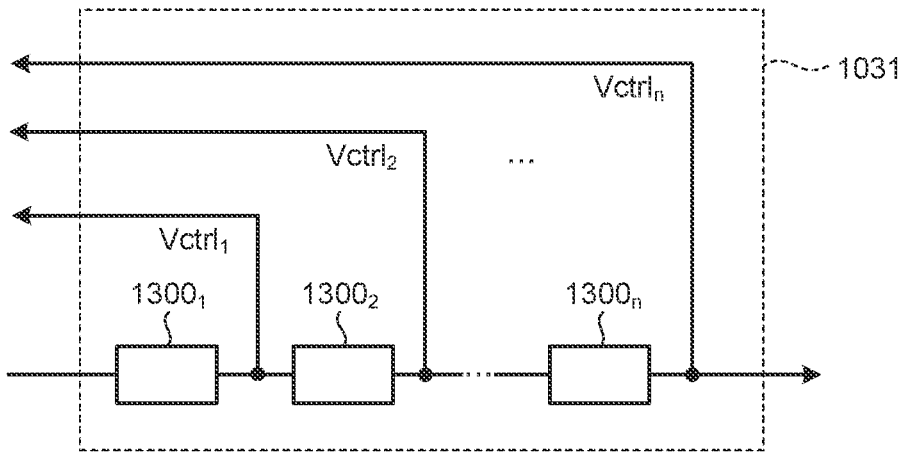
FIG. 14 is a block diagram illustrating an exemplary configuration of a processing circuit that can be applied to the third modification of the first embodiment.

FIG. 14 is a block diagram illustrating an exemplary configuration of the processing circuit 1031 that can be applied to the third modification of the first embodiment. In the example of FIG. 14, the processing circuit 1031 includes a plurality of processing circuits $1300_1$, $1300_2$, . . . , and $1300_n$ that are connected in series. The processing circuits $1300_1$, $1300_2$, . . . , and $1300_n$ respectively output the control signals $Vctrl_1$, $Vctrl_2$, . . . , and $Vctrl_n$ that do not change logic of an input signal. As each of the processing circuits $1300_1$, $1300_2$, . . . , and $1300_n$, for example, a buffer circuit or a delay circuit can be applied.

Content of the processing circuits $1300_1$, $1300_2$, . . . , and $1300_n$ is not specifically limited so long as the content is output without changing the logic of the input signal. The processing circuits $1300_1$, $1300_2$, . . . , and $1300_n$ are not limited to circuits of the same content, and may include a circuit of different content.

Additionally, in the example of FIG. 14, the processing circuits $1300_1$, $1300_2$, . . . , and $1300_n$ are connected in series, but the embodiment is not limited to this example. For example, the processing circuits $1300_1$, $1300_2$, . . . , and $1300_n$ may be connected in parallel with the signal Vinv supplied from the inverter 1002, or parallel connection and serial connection may be used in a mixed manner.

According to the third modification of the first embodiment, signal processing selected from among a plurality of pieces of signal processing can be performed on the signal Vinv output from the inverter 1002.

Fourth Modification of First Embodiment

Figure 15:
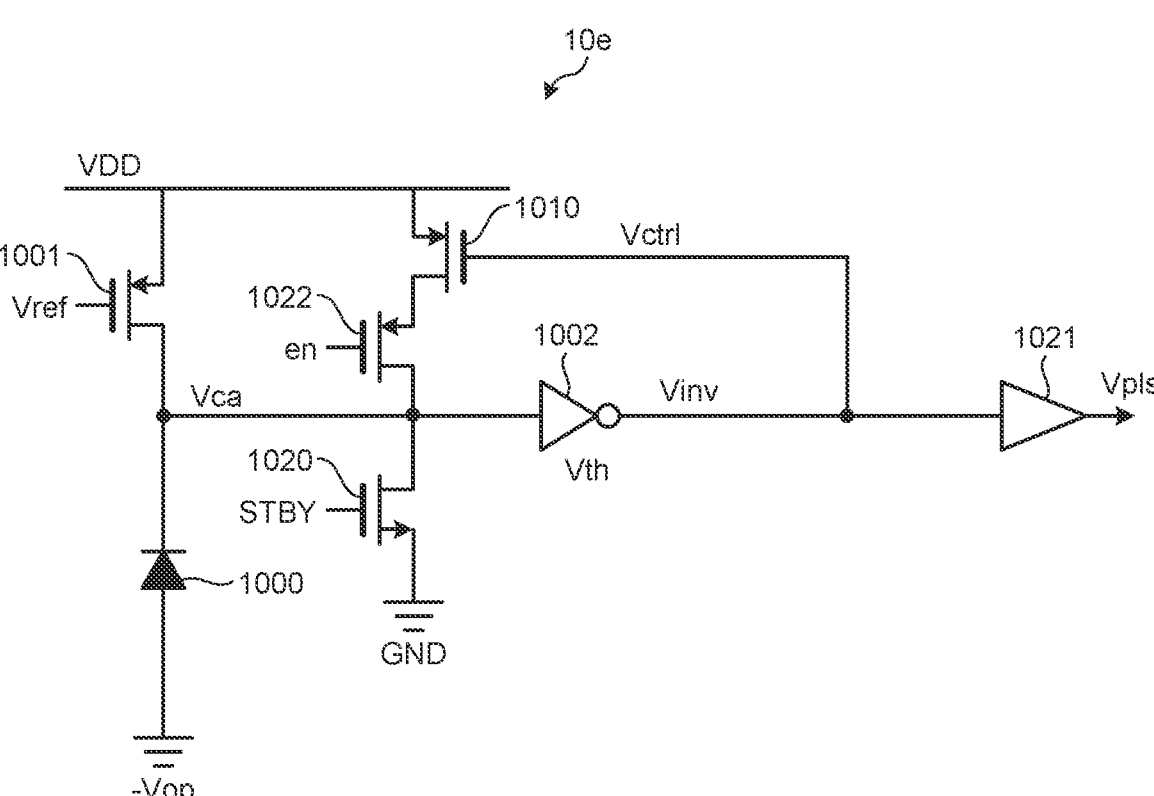
FIG. 15 is a diagram illustrating an exemplary configuration of a pixel according to a fourth modification of the first embodiment.

Next, the following describes a fourth modification of the first embodiment. FIG. 15 is a diagram illustrating an exemplary configuration of a pixel according to the fourth modification of the first embodiment. In FIG. 15, a pixel 10e is obtained by inserting a transistor 1022 as a P-channel MOS transistor between the transistor 1010 and the cathode of the light receiving element 1000 in the pixel 10a illustrated in FIG. 9. Other portions are the same as those in the configuration of FIG. 9 described above, so that detailed description thereof will not be repeated herein.

More specifically, in the pixel 10e, a source of the transistor 1022 is connected to the drain of the transistor 1010. A drain of the transistor 1022 is connected to a connection point to which the cathode of the light receiving element 1000 and the drain of the transistor 1001 are connected. A signal en supplied from the outside of the pixel 10e is input to a gate of the transistor 1022. ON/OFF of the transistor 1022 is controlled in accordance with the signal en.

In the configuration of FIG. 15, an operation in a case of causing the transistor 1022 to be in the ON state is the same as that of the pixel 10a according to the first embodiment described above with reference to FIG. 9 and FIG. 10. An operation in a case of causing the transistor 1022 to be in the OFF state is an operation obtained by prolonging the time required for the recharge operation in the operation according to the existing technique.

For example, at the time $t_{10}$, a voltage obtained by adding the power supply voltage VDD to the breakdown voltage (–Vop) is applied between the cathode and the anode of the light receiving element 1000. In this state, the signal Vinv as an output of the inverter 1002 is in the Low state, and the cathode of the light receiving element 1000 is connected to the power supply voltage VDD via the transistor 1010. When a photon is incident on the light receiving element 1000 in the standby state at the time $t_{11}$, for example, avalanche multiplication is caused by the incident photon, the current flows from the cathode of the light receiving element 1000 toward the anode, and the voltage Vca of the cathode of the light receiving element 1000 drops.

When the voltage Vca taken out from the cathode of the light receiving element 1000 is compared with the threshold voltage Vth in the inverter 1002, and the voltage Vca exceeds the threshold voltage Vth at the time $t_{20}$, the signal Vinv (control signal Vctrl) as an output of the inverter 1002 is inverted to be in the High state, and the transistor 1010 is caused to be in the OFF state.

At the time $t_{12}$, the voltage Vca of the cathode of the light receiving element 1000 drops to the voltage (−Vop), and avalanche multiplication is stopped. The current flows into the cathode of the light receiving element 1000 via the transistor 1001, and the recharge operation for the light receiving element 1000 is started.

At this point, the recharge current is caused to be a smaller value than a predetermined value, so that inclination of rise of the voltage Vca of the cathode caused by the recharge operation becomes inclination indicated by the characteristic line 51 from the time $t_{12}$ to the time $t_{21}$ in FIG. 10, for example, which is moderate as compared with that in the case of not applying the first embodiment (refer to the characteristic line 50). Due to this, a time until the voltage Vca exceeds the threshold voltage Vth next is prolonged as compared with that in the case of not applying the technique according to the present disclosure, so that the electrons accumulated on the deflected portion of the potential can be discharged more securely, and afterpulsing can be prevented from being caused.

When the voltage Vca of the cathode of the light receiving element 1000 exceeds the threshold voltage Vth of the inverter 1002 (time $t_{21}$), the signal Vinv as an output of the inverter 1002 is inverted to be in the Low state. At this point, the transistor 1022 connected to the transistor 1010 in series is in the OFF state, so that the power supply voltage VDD is not supplied to the light receiving element 1000 via the transistor 1010, and the voltage Vca rises while keeping inclination indicated by the characteristic line 51 from the time $t_{12}$ to the time $t_{21}$ in FIG. 10. At the time when the voltage Vca reaches the power supply voltage VDD, the recharge operation is completed.

In this case, in the pixel 10e according to the fourth modification of the first embodiment, the time until the recharge operation is completed is prolonged as compared with that time for the pixel 10a according to the first modification, for example. On this other hand, in the pixel 10e, the power supply voltage VDD is not supplied to the light receiving element 1000 in a case of causing the transistor 1022 to be in the OFF state, so that power consumption can be reduced as compared with a case in which the power supply voltage VDD is supplied to the light receiving element 1000.

In the above description, the transistor 1022 is continuously in the OFF state during an operation period of the light receiving element 1000, but the embodiment is not limited to this example. For example, the transistor 1022 can be caused to be in the OFF state only when the light receiving element 1000 is in the standby state (a period from the time $t_{10}$ to the time $t_{11}$ in FIG. 10), and the transistor 1022 can be caused to be in the ON state in the other periods. In this case, afterpulsing can be prevented without prolonging the time until the recharge operation is completed, and power consumption during standby of the light receiving element 1000 can be reduced.

The configuration according to the fourth modification of the first embodiment can be combined with any of the first embodiment and the first to the third modifications of the first embodiment described above to be performed.

Fifth Modification of First Embodiment

Figure 16:
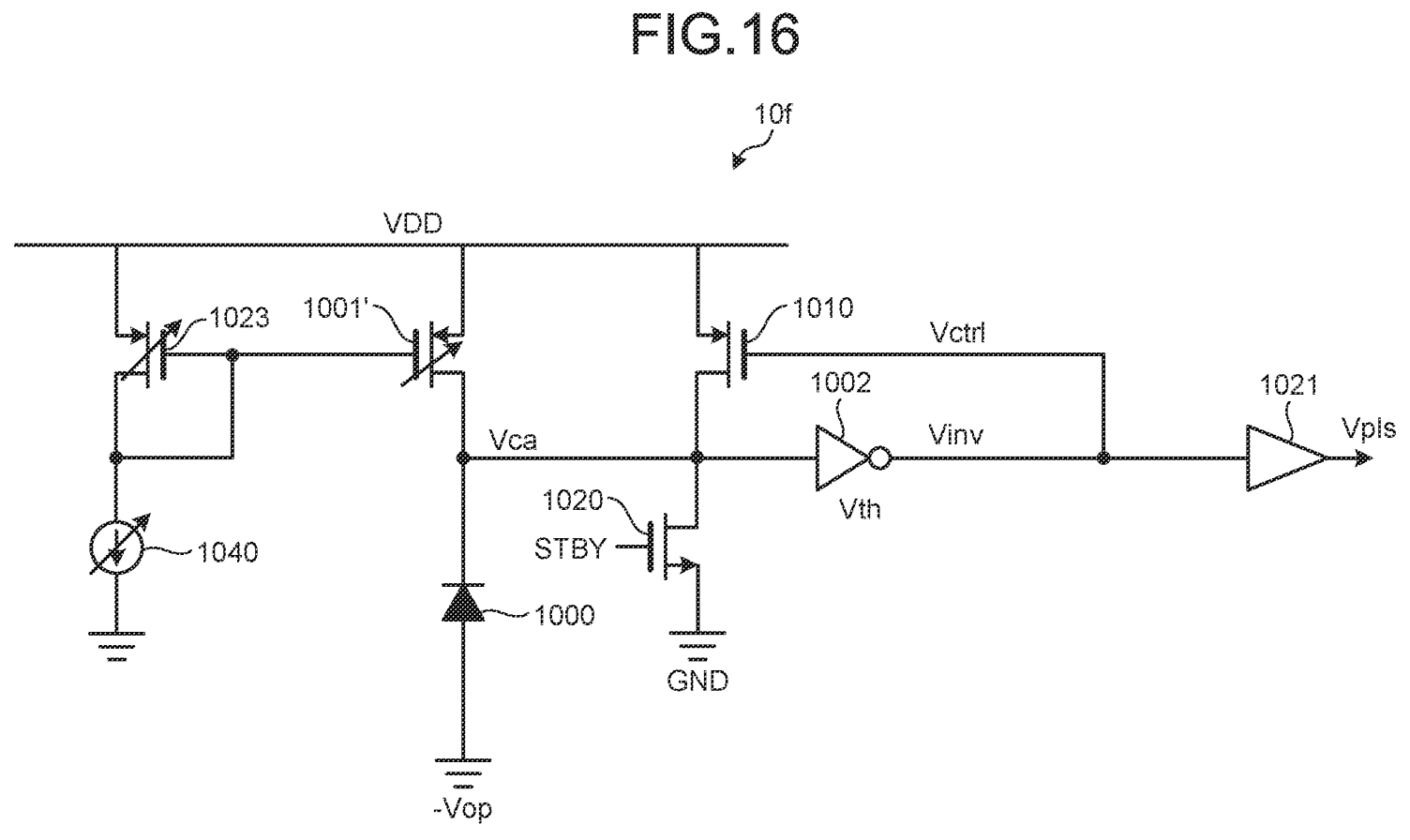

Next, the following describes a fifth modification of the first embodiment. FIG. 16 is a diagram illustrating an exemplary configuration of a pixel according to the fifth modification of the first embodiment. In FIG. 16, by way of example, a pixel 10f has a configuration in which a current supplied from a transistor 1001' as a current source is variable as compared with the pixel 10a illustrated in FIG. 9. Other portions are the same as those in the configuration of FIG. 9 described above, so that detailed description thereof will not be repeated herein.

As described above, the transistor 1001' as a current source is a transistor as a replication destination in the current mirror circuit. In the example of FIG. 16, a replication source of the transistor 1001' in the current mirror circuit is a transistor 1023 as a P-channel MOS transistor, and the transistor 1001' replicates the current supplied from a current source 1040 to be supplied to the light receiving element 1000.

In this configuration, the current to be supplied is caused to be variable in at least one of the transistor 1001', the transistor 1023, and the current source 1040. Due to this, the recharge current supplied to the light receiving element 1000 is caused to be variable, and the charging speed for charging the light receiving element 1000 can be adjusted. The transistor 1001' is constituted of a plurality of transistors connected in parallel, for example, and the current to be supplied can be caused to be variable in accordance with the number of transistors to be in the ON state among the transistors. Similarly, the transistor 1023 can cause the current to be supplied to be variable.

The embodiment is not limited thereto, and the current supplied from the transistor 1010 can be caused to be variable, for example. In this case, the signal Vinv as an output of the inverter 1002 is inverted, and it is possible to adjust a time for raising the voltage Vca of the cathode of the light receiving element 1000 to the power supply voltage VDD (for example, a period from the time $t_{21}$ to the time $t_{13}$ in FIG. 10).

The configuration according to the fifth modification of the first embodiment can be combined with any of the first embodiment and the first to the fourth modifications of the first embodiment described above to be performed.

Sixth Modification of First Embodiment

Figure 17:
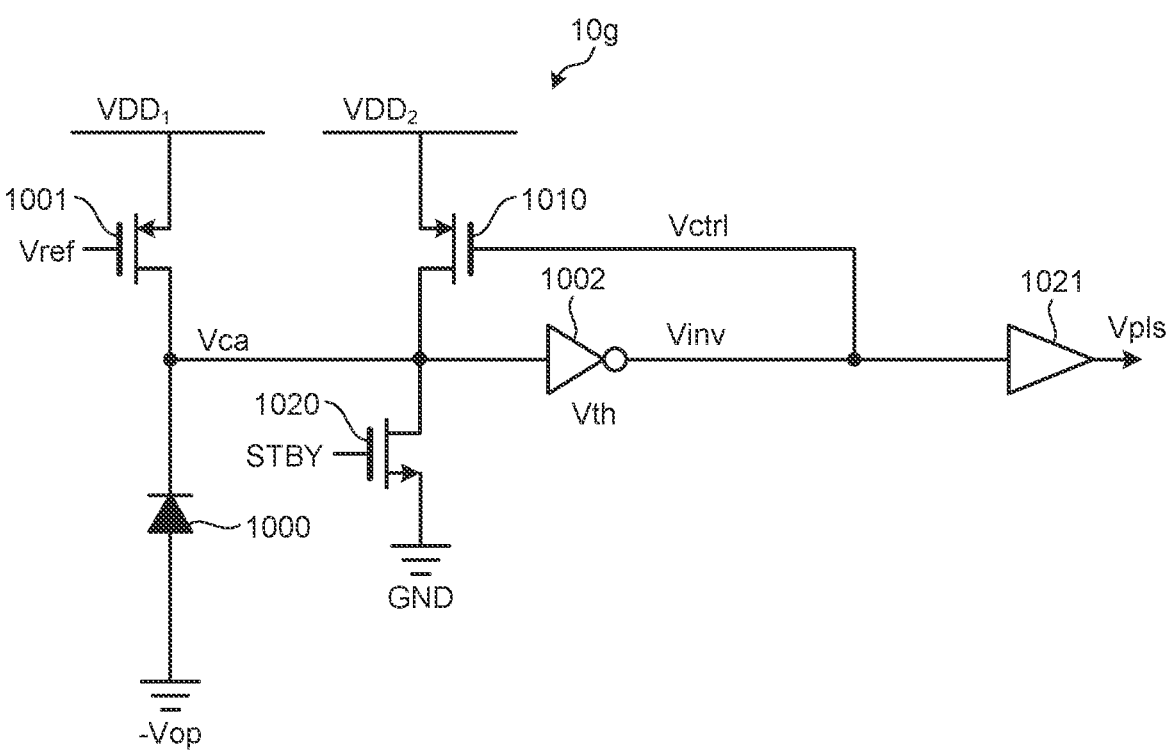
FIG. 17 is a diagram illustrating an exemplary configuration of a pixel according to a sixth modification of the first embodiment.

Next, the following describes a sixth modification of the first embodiment. FIG. 17 is a diagram illustrating an exemplary configuration of a pixel according to the sixth modification of the first embodiment. FIG. 17 illustrates an example of a pixel 10g in which the transistor 1001 as a current source and the transistor 1010 for raising the voltage Vca of the cathode of the light receiving element 1000 to the power supply voltage VDD are connected to different power supplies in contrast to the pixel 10a illustrated in FIG. 9. Other portions are the same as those in the configuration of FIG. 9 described above, so that detailed description thereof will not be repeated herein.

As illustrated in FIG. 17, a source of the transistor 1001 is connected to a power supply voltage $VDD_1$. On the other hand, the source of the transistor 1010 is connected to a power supply voltage $VDD_2$ different from the power supply voltage $VDD_1$. In this case, the power supply voltage $VDD_1$ and the power supply voltage $VDD_2$ may be supplied through respective routes through which different voltages can be supplied, and the voltages are not necessarily different from each other.

In this way, by respectively connecting the sources of the transistors 1001 and 1010 to the different power supply voltages $VDD_1$ and $VDD_2$, it becomes possible to easily control the recharge operation and the operation of raising the voltage Vca of the cathode of the light receiving element 1000 to the power supply voltage VDD in an optimum manner.

The configuration according to the sixth modification of the first embodiment can be combined with any of the first embodiment and the first to the fifth modifications of the first embodiment described above to be performed.

Seventh Modification of First Embodiment

Next, the following describes a seventh modification of the first embodiment. FIG. 18 is a diagram illustrating an exemplary configuration of a pixel according to the seventh modification of the first embodiment. FIG. 18 illustrates an example of a pixel 10h in which the light receiving element 1000 is connected to a power supply side in contrast to the pixel 10a illustrated in FIG. 9.

That is, in FIG. 18, the pixel 10h includes the light receiving element 1000, a transistor 1100 as an N-channel MOS transistor, the inverter 1002, a transistor 1110 as an N-channel MOS transistor, and a transistor 1120 as a P-channel MOS transistor. The pixel 10h may also include a buffer circuit 1121.

In FIG. 18, the cathode of the light receiving element 1000 is connected to a power supply of the voltage Vop corresponding to the breakdown voltage of the light receiving element 1000, and the anode thereof is connected to a drain of the transistor 1100 as a current source. A source of the transistor 1100 is connected to the ground potential GND. The voltage Vop is a voltage obtained by adding the excessive bias voltage Ve to the voltage Vbd as the breakdown voltage of the light receiving element 1000. The reference voltage Vref is input to a gate of the transistor 1100. The transistor 1100 is a current source that outputs the current corresponding to the ground potential GND and the reference voltage Vref through the drain.

A voltage Van taken out from a connection point to which the anode of the light receiving element 1000 and the drain of the transistor 1100 are connected is input to the inverter 1002. The inverter 1002 performs, for example, determination for the input voltage Van, and outputs the signal Vinv that is inverted every time the voltage Van exceeds the threshold voltage Vth in the positive direction or the negative direction. The signal Vinv output from the inverter 1002 is output as the signal Vpls via the buffer circuit 1121, for example.

A drain of the transistor 1110 and a drain of the transistor 1120 are further connected to the connection point to which the anode of the light receiving element 1000 and the drain of the transistor 1100 are connected. A source of the transistor 1120 is connected to the power supply voltage VDD corresponding to the excessive bias voltage Ve, and the signal STBY is input to a gate thereof. A part between the source and the drain of the transistor 1120 is caused to be in the ON state while the signal STBY is in the Low state, and the voltage Van of the anode of the light receiving element 1000 is forced to be the voltage VDD. Due to this, the voltage $V_{CTH-AN}$ between the cathode and the anode of the light receiving element 1000 is caused to be the voltage Vbd, and the avalanche multiplication reaction is prevented to be easily caused in the light receiving element 1000.

A source of the transistor 1110 is connected to the ground potential GND. The signal Vinv output from the inverter 1002 is input to a gate of the transistor 1110 as the control signal Vctrl. The transistor 1110 is caused to be in the ON state while the signal Vinv, that is, the control signal Vctrl is in the High state, and the anode of the light receiving element 1000 is connected to the ground potential GND.

FIG. 19 is a diagram illustrating an example of variation in the voltage Van of the anode of the light receiving element 1000 in the configuration according to the seventh modification of the first embodiment illustrated in FIG. 18. In FIG. 19, a characteristic line 60 indicates the voltage Van in a case of not applying the seventh modification of the first embodiment, and a characteristic line 61 indicates the voltage Van in a case of applying the seventh modification of the first embodiment.

In FIG. 19, a time $t_{30}$ corresponds to the time $t_{100}$ in the chart 40 of FIG. 7, and the voltage Vop is applied between the cathode and the anode of the light receiving element 1000. The voltage Vop is a voltage obtained by adding the voltage Vbd as the breakdown voltage of the light receiving element 1000 to the voltage corresponding to the excessive bias voltage Ve described above for the light receiving element 1000, and the light receiving element 1000 is in the standby state for incidence of a photon. In this state, the signal Vinv as an output of the inverter 1002 is in the High state, and the anode of the light receiving element 1000 is connected to the ground potential GND via the transistor 1110.

When a photon is incident on the light receiving element 1000 in the standby state at a time $t_{31}$, for example, avalanche multiplication is caused by the incident photon. Due to this avalanche multiplication, the current flows from the cathode of the light receiving element 1000 toward the anode, and the voltage Van of the anode of the light receiving element 1000 rises.

The voltage Van taken out from the anode of the light receiving element 1000 is input to the inverter 1002, and compared with the threshold voltage Vth in the inverter 1002. When the voltage Van exceeds the threshold voltage Vth at a time $t_{40}$, the signal Vinv (control signal Vctrl) as an output of the inverter 1002 is inverted to be in the Low state, and the transistor 1110 is caused to be in the OFF state.

At a time $t_{32}$, the voltage Van of the anode of the light receiving element 1000 rises to the voltage Vbd, the voltage $V_{CTH-AN}$ between the cathode and the anode of the light receiving element 1000 reaches the voltage Vbd, and avalanche multiplication is stopped. The current flows to the anode of the light receiving element 1000 via the transistor 1100, and the recharge operation for the light receiving element 1000 is started.

At this point, by causing the recharge current to have a value smaller than a predetermined value, as exemplified by the characteristic line 61, inclination of rise of the voltage Van of the anode caused by the recharge operation can be moderated as compared with a case of not applying the seventh modification of the first embodiment (refer to the characteristic line 60). For example, the recharge current is caused to be a smaller current as compared with a case of not applying the technique according to the present disclosure. Due to this, the time until the voltage Van exceeds the threshold voltage Vth next is prolonged as compared with the case of not applying the technique according to the present disclosure, so that the electrons accumulated on the deflected portion of the potential can be discharged more securely, and afterpulsing can be prevented from being caused.

When the voltage Van of the anode of the light receiving element 1000 exceeds the threshold voltage Vth of the inverter 1002 (time $t_{41}$), the signal Vinv as an output of the inverter 1002 is inverted to be in the High state. When the signal Vinv is caused to be in the High state, the transistor

1110 is caused to be in the ON state, and the ground potential GND is supplied to the anode of the light receiving element 1000 via the transistor 1110. Due to this, as indicated by the characteristic line 61 starting from the time$_{41}$ in FIG. 19, the voltage Van of the anode of the light receiving element 1000 is forced to drop to the ground potential GND, and the recharge operation is completed (time t$_{33}$).

Through the operation described above, with the configuration in which the light receiving element 1000 is connected to the power supply side, afterpulsing can be prevented from being caused without prolonging the time required for the recharge operation similarly to the configuration according to the first embodiment described above with reference to FIG. 9 and FIG. 10.

In this example, similarly to the first embodiment described above, in a case in which the transistor 1110 is in the ON state, when a current larger than a predetermined current flows out from the anode of the light receiving element 1000 via the transistor 1110, energy with which avalanche multiplication can be started may be given to the electron remaining in the light receiving element 1000 to cause afterpulsing. Thus, the current flowing into the light receiving element 1000 in a case in which the transistor 1110 is in the ON state is caused to be smaller than the latching current of the light receiving element 1000.

The configuration according to the seventh modification of the first embodiment can be combined with any of the first embodiment and the first to the sixth modifications of the first embodiment described above to be performed.

*Eighth Modification of First Embodiment*

Next, the following describes an eighth modification of the first embodiment. The eighth modification of the first embodiment is an example of applying the configuration related to the technique of the present disclosure to a laminated structure configured by laminating two semiconductor chips as described above with reference to FIG. 6. By way of example, the following describes an example of applying the pixel 10*a* according to the first embodiment described above with reference to FIG. 9 to the laminated structure.

FIG. 20 is a diagram illustrating an example of disposition of parts of the pixel 10*a* according to the eighth modification of the first embodiment. The configuration of the pixel 10*a* is the same as the configuration described above with reference to FIG. 9. With reference to FIG. 6, in the example of FIG. 20, the light receiving element 1000 among elements included in the pixel 10*a* is disposed on the upper chip 210, and the other elements (the transistors 1001, 1010, and 1020, the inverter 1002, and the buffer circuit 1021) are disposed on the lower chip 211.

The cathode of the light receiving element 1000 is connected to the drain of the transistor 1001 disposed on the lower chip 211 via a coupling part 212*a*. The anode of the light receiving element 1000 is connected to wiring of the voltage (−Vbd) disposed on the lower chip 211 via a coupling part 212*b*. The coupling parts 212*a* and 212*b* are formed by Copper-Copper Connection (CCC), for example.

In this way, by disposing the light receiving element 1000 on the upper chip 210, and disposing the other elements on the lower chip 211, an area of the light receiving surface of the light receiving element 1000 can be enlarged, and sensitivity of the light receiving element 1000 can be improved.

The disposition of the respective elements of the pixel 10*a* on the upper chip 210 and the lower chip 211 illustrated in FIG. 20 is merely an example, and the embodiment is not limited to this example. For example, the light receiving element 1000 and the inverter 1002 may be disposed on the upper chip 210, and the other elements may be disposed on the lower chip 211. The laminated structure may be a structure in which three or more semiconductor chips are laminated. In such a case, for example, the light receiving element 1000 is disposed on the semiconductor chip as an outermost surface, and the other elements are disposed on the respective layers as appropriate.

With reference to FIG. 20, described is the example of applying the configuration according to the eighth modification of the first embodiment to the configuration according to the first embodiment described above, but the embodiment is not limited to this example. That is, the configuration according to the eighth modification of the first embodiment can be combined with any of the first to the seventh modifications of the first embodiment described above to be performed.

*Second Embodiment*

Next, as a second embodiment, the following describes an application example of the electronic appliance 6 using any of the pixels 10*a* to 10*h* in the first embodiment and the modifications thereof according to the present disclosure. FIG. 21 is a diagram illustrating a usage example of using the electronic appliance 6 with any of the pixels 10*a* to 10*h* according to the first embodiment and the modifications thereof described above.

For example, the electronic appliance 6 described above can be used for various cases of sensing light such as visible light, infrared light, ultraviolet light, and X-rays as described below.

A device for photographing an image for appreciation such as a digital camera or a mobile device with a camera function.

A device for traffic such as a vehicle-mounted sensor for photographing a front side, a rear side, surroundings, the inside, and the like of an automobile, a surveillance camera for monitoring a traveling vehicle and a road, and a range-finding sensor for measuring a distance between vehicles for safe driving with automatic stop and the like and for recognizing a state of a driver.

A device used for household electrical appliances such as a TV, a refrigerator, and an air conditioner for photographing a gesture of a user and performing an appliance operation in accordance with the gesture.

A device used for a medical service or health care such as an endoscope or a device for performing angiography by receiving infrared light.

A device used for security such as a surveillance camera for preventing crimes, or a camera used for authenticating a person.

A device used for beauty care such as a skin measuring instrument for photographing skin, or a microscope for photographing a scalp.

A device used for sports such as an action camera or a wearable camera used for sports and the like.

A device used for agriculture such as a camera for monitoring a state of a field or crops.

Additional Application Example of Technique According to Present Disclosure

The technique according to the present disclosure (the present technique) can be applied to various products. For example, the technique according to the present disclosure may be applied to an endoscope surgery system.

Application Example to Body Interior Information Acquisition System

FIG. 22 is a block diagram illustrating an example of a brief configuration of a body interior information acquisition system for a patient using a capsule type endoscope to which the technique according to the present disclosure (present technique) may be applied.

A body interior information acquisition system 10001 is constituted of a capsule type endoscope 10100 and an external control device 10200.

The capsule type endoscope 10100 is swallowed by a patient at the time of examination. The capsule type endoscope 10100 has an imaging function and a wireless communication function, successively takes an image of the inside of organs (hereinafter, also referred to as a body interior image) at predetermined intervals while moving inside the organs such as a stomach and an intestine by peristaltic movement until being naturally discharged from the patient, and successively transmits information about the body interior image to the external control device 10200 outside a patient's body in a wireless manner.

The external control device 10200 integrally controls an operation of the body interior information acquisition system 10001. The external control device 10200 receives the information about the body interior image transmitted from the capsule type endoscope 10100, and generates image data for displaying the body interior image on a display device (not illustrated) based on the received information about the body interior image.

In this way, the body interior information acquisition system 10001 can acquire the body interior image obtained by photographing a state of the interior of the patient's body as occasion demands in a period from when the capsule type endoscope 10100 is swallowed until the capsule type endoscope 10100 is discharged.

The following describes configurations and functions of the capsule type endoscope 10100 and the external control device 10200 in more detail.

The capsule type endoscope 10100 includes a capsule type housing 10101, and the housing 10101 houses a light source unit 10111, an imaging unit 10112, an image processing unit 10113, a wireless communication unit 10114, an electric supply unit 10115, a power supply unit 10116, and a control unit 10117.

The light source unit 10111 is constituted of, for example, a light source such as a light emitting diode (LED), and irradiates an imaging visual field of the imaging unit 10112 with light.

The imaging unit 10112 is constituted of an imaging element, and an optical system including a plurality of lenses disposed at a preceding stage of the imaging element. Reflected light of the light emitted to a body tissue as an observation target (hereinafter, referred to as observation light) is collected by the optical system, and incident on the imaging element. In the imaging unit 10112, the observation light incident on the imaging element is photoelectrically converted by the imaging element, and an image signal corresponding to the observation light is generated. The image signal generated by the imaging unit 10112 is provided to the image processing unit 10113.

The image processing unit 10113 is constituted of a processor such as a CPU or a Graphics Processing Unit (GPU), and performs various pieces of signal processing on the image signal generated by the imaging unit 10112. The image processing unit 10113 provides the image signal subjected to signal processing to the wireless communication unit 10114 as RAW data.

The wireless communication unit 10114 performs predetermined processing such as modulation processing on the image signal on which signal processing is performed by the image processing unit 10113, and transmits the image signal to the external control device 10200 via an antenna 10114A. The wireless communication unit 10114 receives, from the external control device 10200, a control signal related to driving control of the capsule type endoscope 10100 via the antenna 10114A. The wireless communication unit 10114 provides the control signal received from the external control device 10200 to the control unit 10117.

The electric supply unit 10115 is constituted of an antenna coil for receiving power, a power regeneration circuit for regenerating electric power from a current generated in the antenna coil, a boosting circuit, and the like. In the electric supply unit 10115, electric power is generated by using what is called a principle of non-contact charging.

The power supply unit 10116 is constituted of a secondary cell, and accumulates electric power generated by the electric supply unit 10115. In FIG. 22, for preventing the drawing from being complicated, an arrow and the like indicating a supply destination of electric power from the power supply unit 10116 are not illustrated. The electric power accumulated in the power supply unit 10116 is supplied to the light source unit 10111, the imaging unit 10112, the image processing unit 10113, the wireless communication unit 10114, and the control unit 10117, and may be used for driving them.

The control unit 10117 is constituted of a processor such as a CPU, and controls driving of the light source unit 10111, the imaging unit 10112, the image processing unit 10113, the wireless communication unit 10114, and the electric supply unit 10115 as appropriate in accordance with the control signal transmitted from the external control device 10200.

The external control device 10200 is constituted of a microcomputer, a control board, or the like on which a processor such as a CPU and a GPU is mounted, or on which a processor and a storage element such as a memory are mounted in a mixed manner. The external control device 10200 transmits the control signal to the control unit 10117 of the capsule type endoscope 10100 via an antenna 10200A to control an operation of the capsule type endoscope 10100. For example, in the capsule type endoscope 10100, a light irradiation condition of the light source unit 10111 for an observation target may be changed by the control signal from the external control device 10200. An imaging condition (for example, a frame rate, an exposure value, and the like of the imaging unit 10112) may also be changed by the control signal from the external control device 10200. By the control signal from the external control device 10200, content of processing performed by the image processing unit 10113 or a condition for transmitting an image signal by the wireless communication unit 10114 (for example, a transmission interval, the number of images to be transmitted, and the like) may be changed.

The external control device 10200 performs various pieces of image processing on the image signal transmitted from the capsule type endoscope 10100, and generates image data for displaying the taken body interior image on the display device. As the image processing, for example, development processing (demosaic processing), image quality enhancing processing (band emphasis processing, super-resolution processing, noise reduction processing, camera shake correction processing, and the like), magnification processing (electronic zoom processing), and the like may be independently performed or may be combined to perform various pieces of signal processing. The external control device 10200 controls driving of the display device to display the body interior image that has been taken based on the generated image data. Alternatively, the external control device 10200 may cause a recording device (not illustrated) to record the generated image data, or may cause a printing device (not illustrated) to print and output the generated image data.

An example of the body interior information acquisition system to which the technique according to the present disclosure may be applied has been described above. By applying the technique according to the present disclosure to the imaging unit 10112, the imaging unit 10112 can be controlled more stably.

Application Example to Endoscope Surgery System

The technique according to the present disclosure may also be applied to an endoscope surgery system. FIG. 23 is a diagram illustrating an example of a brief configuration of the endoscope surgery system to which the technique according to the present disclosure (present technique) may be applied.

FIG. 23 illustrates a state in which an operator (doctor) 11131 performs surgery on a patient 11132 on a patient bed 11133 using an endoscope surgery system 11000. As illustrated in the drawing, the endoscope surgery system 11000 is constituted of an endoscope 11100, other operation tools 11110 such as a pneumoperitoneum tube 11111 and an energy treatment tool 11112, a support arm device 11120 supporting the endoscope 11100, and a cart 11200 on which various devices for endoscopic surgery are mounted.

The endoscope 11100 is constituted of a lens barrel 11101 including a region of a predetermined length from a distal end to be inserted into a body cavity of the patient 11132, and a camera head 11102 connected to a base end of the lens barrel 11101. In the example illustrated in the drawing, the endoscope 11100 is configured as what is called a hard mirror including the lens barrel 11101 that is hard, but the endoscope 11100 may be configured as what is called a soft mirror including a soft lens barrel.

An opening into which an object lens is inserted is disposed at a distal end of the lens barrel 11101. A light source device 11203 is connected to the endoscope 11100. Light generated by the light source device 11203 is guided to the distal end of the lens barrel by a light guide disposed to be extended inside the lens barrel 11101, and emitted onto an observation target in the body cavity of the patient 11132 via the object lens. The endoscope 11100 may be a forward-viewing endoscope, a forward-oblique viewing endoscope, or a side-viewing endoscope.

An optical system and an imaging element are disposed inside the camera head 11102, and reflected light (observation light) from the observation target is collected into the imaging element by the optical system. The observation light is photoelectrically converted by the imaging element, and an electric signal corresponding to the observation light, that is, an image signal corresponding to an observation image is generated. The image signal is transmitted to a camera control unit (CCU) 11201 as RAW data.

The CCU 11201 is constituted of a CPU, a GPU, and the like, and integrally controls operations of the endoscope 11100 and a display device 11202. Additionally, the CCU 11201 receives the image signal from the camera head 11102, and performs, on the image signal, various pieces of image processing for displaying an image based on the image signal such as development processing (demosaic processing), for example.

Under control by the CCU 11201, the display device 11202 displays an image based on the image signal on which image processing is performed by the CCU 11201.

The light source device 11203 is constituted of a light source such as a light emitting diode (LED), for example, and supplies irradiation light for photographing a surgical part and the like to the endoscope 11100.

An input device 11204 is an input interface for the endoscope surgery system 11000. A user can input various pieces of information or make an instruction input to the endoscope surgery system 11000 via the input device 11204. For example, the user inputs an instruction and the like to change the imaging condition for the endoscope 11100 (a type of irradiation light, magnification, a focal distance, and the like).

A treatment tool control device 11205 controls driving of the energy treatment tool 11112 for cauterization or incision of tissues, sealing of a blood vessel, and the like. A pneumoperitoneum device 11206 feeds gas into the body cavity via the pneumoperitoneum tube 11111 to inflate the body cavity of the patient 11132 for the purpose of securing a visual field of the endoscope 11100 and securing a work space for the operator. A recorder 11207 is a device that can record various pieces of information related to surgery. A printer 11208 is a device that can print various pieces of information related to surgery in various formats such as text, an image, or a graph.

The light source device 11203 that supplies irradiation light for photographing the surgical part to the endoscope 11100 may be constituted of a white light source constituted of an LED, a laser light source, or a combination thereof, for example. In a case in which the white light source is configured by combining RGB laser light sources, output intensity and an output timing of each color (each wavelength) can be controlled with high accuracy, so that the light source device 11203 can adjust white balance of a taken image. Additionally, in this case, images respectively corresponding to RGB can be taken in a time-division manner by irradiating the observation target with laser light from each of the RGB laser light sources in a time-division manner, and controlling driving of the imaging element of the camera head 11102 in synchronization with the irradiation timing. According to this method, a color image can be obtained without disposing a color filter on the imaging element.

The light source device 11203 may be controlled to be driven to change intensity of light to be output every predetermined time. By acquiring images in a time-division manner by controlling driving of the imaging element of the camera head 11102 in synchronization with a timing of changing light intensity, and combining the images, an image of high dynamic range without what is called black crushing or whiteout can be generated.

The light source device 11203 may be configured to be able to supply light of a predetermined wavelength band corresponding to special light observation. In the special light observation, what is called Narrow Band Imaging for photographing predetermined tissues such as a blood vessel and the like in a mucous membrane surface layer with high contrast is performed by emitting light of a narrower band as compared with irradiation light in normal observation (that is, white light) using wavelength dependency of light absorption in body tissues, for example. Alternatively, in the special light observation, fluorescence observation may be performed to obtain an image by fluorescence that is generated by emitting excitation light. In the fluorescence observation, excitation light can be emitted onto body tissues to observe fluorescence from the body tissues (self-fluorescence observation), or a reagent such as indocyanine green (ICG) can be locally injected into body tissues and excitation light corresponding to a fluorescence wavelength of the reagent can be emitted onto the body tissues to obtain a fluorescent image, for example. The light source device 11203 may be configured to be able to supply excitation light and/or narrow-band light corresponding to such special light observation.

FIG. 24 is a block diagram illustrating an example of a functional configuration of the camera head 11102 and the CCU 11201 illustrated in FIG. 23.

The camera head 11102 includes a lens unit 11401, an imaging unit 11402, a driving unit 11403, a communication unit 11404, and a camera head control unit 11405. The CCU 11201 includes a communication unit 11411, an image processing unit 11412, and a control unit 11413. The camera head 11102 and the CCU 11201 are connected to each other in a communicable manner via a transmission cable 11400.

The lens unit 11401 is an optical system disposed at a connection part with the lens barrel 11101. The observation light taken in from the distal end of the lens barrel 11101 is guided to the camera head 11102, and incident on the lens unit 11401. The lens unit 11401 is configured by combining a plurality of lenses including a zoom lens and a focus lens.

The imaging unit 11402 is constituted of an imaging element. The imaging unit 11402 may be constituted of one imaging element (what is called a single-plate type), or a plurality of imaging elements (what is called a multi-plate type). In a case in which the imaging unit 11402 is configured to be the multi-plate type, for example, image signals respectively corresponding to RGB may be generated by the respective imaging elements, and the image signals may be combined to obtain a color image. Alternatively, the imaging unit 11402 may include a pair of imaging elements for respectively acquiring an image signal for a right eye and an image signal for a left eye corresponding to three dimensional (3D) display. When 3D display is performed, the operator 11131 can grasp a depth of living body tissues at the surgical part more accurately. In a case in which the imaging unit 11402 is configured to be the multi-plate type, a plurality of systems of lens units 11401 may be disposed corresponding to the respective imaging elements.

The imaging unit 11402 is not necessarily disposed in the camera head 11102. For example, the imaging unit 11402 may be disposed immediately after the object lens inside the lens barrel 11101.

The driving unit 11403 is constituted of an actuator, and moves the zoom lens and the focus lens of the lens unit 11401 by a predetermined distance along an optical axis under control by the camera head control unit 11405. Due to this, magnification and a focal point of the taken image taken by the imaging unit 11402 may be adjusted as appropriate.

The communication unit 11404 is constituted of a communication device for transmitting/receiving various pieces of information to/from the CCU 11201. The communication unit 11404 transmits the image signal obtained from the imaging unit 11402 to the CCU 11201 as RAW data via the transmission cable 11400.

The communication unit 11404 also receives a control signal for controlling driving of the camera head 11102 from the CCU 11201, and supplies the control signal to the camera head control unit 11405. The control signal includes, for example, information related to the imaging condition such as information designating a frame rate of the taken image, information designating an exposure value at the time of imaging, and/or information designating magnification and a focal point of the taken image.

Imaging conditions such as the frame rate, the exposure value, the magnification, and the focal point described above may be appropriately designated by the user, or may be automatically set by the control unit 11413 of the CCU 11201 based on the acquired image signal. In the latter case, what is called an Auto Exposure (AE) function, an Auto Focus (AF) function, and an Auto White Balance (AWB) function are assumed to be mounted on the endoscope 11100.

The camera head control unit 11405 controls driving of the camera head 11102 based on the control signal that is received from the CCU 11201 via the communication unit 11404.

The communication unit 11411 is constituted of a communication device for transmitting/receiving various pieces of information to/from the camera head 11102. The communication unit 11411 receives the image signal that is transmitted from the camera head 11102 via the transmission cable 11400.

The communication unit 11411 also transmits a control signal for controlling driving of the camera head 11102 to the camera head 11102. The image signal and the control signal can be transmitted by telecommunication, optical communication, and the like.

The image processing unit 11412 performs various pieces of image processing on the image signal as RAW data transmitted from the camera head 11102.

The control unit 11413 performs various kinds of control related to imaging of the surgical part and the like by the endoscope 11100, and display of the taken image obtained by imaging the surgical part and the like. For example, the control unit 11413 generates a control signal for controlling driving of the camera head 11102.

The control unit 11413 also causes the display device 11202 to display the taken image in which the surgical part and the like are reflected based on the image signal on which image processing is performed by the image processing unit 11412. At this point, the control unit 11413 may recognize various objects in the taken image by using various image recognition techniques. For example, by detecting a shape of an edge, a color, and the like of an object included in the taken image, the control unit 11413 can recognize an operation tool such as forceps, a specific living body part, bleeding, mist generated at the time when the energy treatment tool 11112 is used, and the like. At the time of causing the display device 11202 to display the taken image, the control unit 11413 may superimpose various pieces of surgery support information on the image of the surgical part to be displayed by using the recognition result. By superimposing and displaying the surgery support information to be presented to the operator 11131, a burden on the operator 11131 can be reduced, and the operator 11131 can securely advance surgery.

The transmission cable 11400 connecting the camera head 11102 with the CCU 11201 is an electric signal cable supporting communication of electric signals, an optical fiber supporting optical communication, or a composite cable thereof.

In the example of FIG. 24, communication is performed in a wired manner using the transmission cable 11400, but the communication between the camera head 11102 and the CCU 11201 may be performed in a wireless manner.

An example of the endoscope surgery system to which the technique according to the present disclosure may be applied has been described above. By applying the technique according to the present disclosure to an imaging unit 10402, the imaging unit 10402 can be controlled more stably.

By way of example, the endoscope surgery system is described herein, but the technique according to the present disclosure may also be applied to a microscope surgery system and the like, for example.

Application Example to Mobile Object

The technique according to the present disclosure may also be applied to a device mounted on various mobile objects such as an automobile, an electric vehicle, a hybrid electric vehicle, a motorcycle, a bicycle, a personal mobility, an airplane, a drone, a ship, and a robot.

FIG. 25 is a block diagram illustrating a brief configuration example of a vehicle control system as an example of a mobile object control system to which the technique according to the present disclosure may be applied.

A vehicle control system 12000 includes a plurality of electronic control units connected to each other via a communication network 12001. In the example illustrated in FIG. 25, the vehicle control system 12000 includes a driving system control unit 12010, a body system control unit 12020, a vehicle outside information detection unit 12030, a vehicle inside information detection unit 12040, and an integrated control unit 12050. As functional configurations of the integrated control unit 12050, a microcomputer 12051, a voice image output unit 12052, and a vehicle-mounted network interface (I/F) 12053 are illustrated.

The driving system control unit 12010 controls an operation of a device related to a driving system of a vehicle in accordance with various computer programs. For example, the driving system control unit 12010 functions as a control device for a driving force generation device for generating driving force of the vehicle such as an internal combustion engine or a motor for driving, a driving force transmission mechanism for transmitting driving force to wheels, a steering mechanism for adjusting a rudder angle of the vehicle, a braking device for generating braking force of the vehicle, and the like.

The body system control unit 12020 controls operations of various devices mounted on a vehicle body in accordance with various computer programs. For example, the body system control unit 12020 functions as a control device for a keyless entry system, a smart key system, a power window device, or various lamps such as a head lamp, a back lamp, a brake lamp, an indicator, or a fog lamp. In this case, radio waves sent from a portable machine as a substitute for a key or signals of various switches may be input to the body system control unit 12020. The body system control unit 12020 receives an input of the radio waves or signals to control a door lock device, a power window device, a lamp, and the like of the vehicle.

The vehicle outside information detection unit 12030 detects information about the outside of the vehicle on which the vehicle control system 12000 is mounted. For example, an imaging unit 12031 is connected to the vehicle outside information detection unit 12030. The vehicle outside information detection unit 12030 causes the imaging unit 12031 to take an image of the outside of the vehicle, and receives the taken image. The vehicle outside information detection unit 12030 may perform distance detection processing or object detection processing for a person, a vehicle, an obstacle, a sign, a character on a road surface, or the like based on the received image. The vehicle outside information detection unit 12030 performs image processing on the received image, for example, and performs object detection processing or distance detection processing based on a result of the image processing.

The imaging unit 12031 is an optical sensor that receives light, and outputs an electric signal corresponding to a quantity of the received light. The imaging unit 12031 may output the electric signal as an image, or may output the electric signal as information of range-finding. The light received by the imaging unit 12031 may be visible light, or may be invisible light such as infrared rays.

The vehicle inside information detection unit 12040 detects information about the inside of the vehicle. For example, a driver state detection unit 12041 for detecting a state of a driver is connected to the vehicle inside information detection unit 12040, for example. The driver state detection unit 12041 includes a camera for imaging the driver, for example, and the vehicle inside information detection unit 12040 may calculate a degree of fatigue or a degree of concentration of the driver, or may determine whether the driver is sleeping based on detection information input from the driver state detection unit 12041.

The microcomputer 12051 may compute a control target value of the driving force generation device, the steering mechanism, or the braking device based on the information about the inside or the outside of the vehicle acquired by the vehicle outside information detection unit 12030 or the vehicle inside information detection unit 12040, and output a control command to the driving system control unit 12010. For example, the microcomputer 12051 can perform cooperative control for the purpose of implementing a function of an Advanced Driver Assistance System (ADAS) including collision avoidance or impact mitigation for the vehicle, following travel based on an inter-vehicle distance, vehicle speed maintaining travel, a collision warning for the vehicle, a lane deviation warning for the vehicle, and the like.

The microcomputer 12051 can also perform cooperative control for the purpose of automatic driving for autonomously traveling without an operation by the driver by controlling the driving force generation device, the steering mechanism, the braking device, or the like based on the information about the surroundings of the vehicle acquired by the vehicle outside information detection unit 12030 or the vehicle inside information detection unit 12040.

The microcomputer 12051 can output a control command to the body system control unit 12020 based on the information about the outside of the vehicle acquired by the vehicle outside information detection unit 12030. For example, the microcomputer 12051 can perform cooperative control for the purpose of preventing glare such as switching a high beam to a low beam by controlling the head lamp in accordance with a position of a preceding vehicle or an oncoming vehicle detected by the vehicle outside information detection unit 12030.

The voice image output unit 12052 transmits an output signal of at least one of a voice and an image to an output device that can visually or aurally notify a passenger on the vehicle or the outside of the vehicle of information. In the example of FIG. 25, as the output device, an audio speaker 12061, a display unit 12062, and an instrument panel 12063 are exemplified. The display unit 12062 may include, for example, at least one of an onboard display and a head-up display.

FIG. 26 is a diagram illustrating an example of a disposed position of the imaging unit 12031. In FIG. 26, a vehicle 12100 includes imaging units 12101, 12102, 12103, 12104, and 12105 as the imaging unit 12031.

For example, the imaging units 12101, 12102, 12103, 12104, and 12105 are disposed at positions such as a front nose of the vehicle 12100, a side mirror, a rear bumper, a back door, an upper part of a windshield in a compartment, and the like. The imaging unit 12101 disposed at the front nose and the imaging unit 12105 disposed at the upper part of the windshield in the compartment mainly acquire an image of a front side of the vehicle 12100. The imaging units 12102 and 12103 disposed on side mirrors mainly acquire an image of a side of the vehicle 12100. The imaging unit 12104 disposed at the rear bumper or the back door mainly acquires an image of a rear side of the vehicle 12100. The image of the front side acquired by the imaging units 12101 and 12105 is mainly used for detecting a preceding vehicle, a pedestrian, an obstacle, traffic lights, a traffic sign, a lane, or the like.

FIG. 26 illustrates an example of photographing ranges of the imaging units 12101 to 12104. An imaging range 12111 indicates an imaging range of the imaging unit 12101 disposed at the front nose, imaging ranges 12112 and 12113 indicate imaging ranges of the imaging units 12102 and 12103 respectively disposed on the side mirrors, and an imaging range 12114 indicates an imaging range of the imaging unit 12104 disposed on the rear bumper or the back door. For example, by overlapping pieces of image data taken by the imaging units 12101 to 12104, an overhead image viewing the vehicle 12100 from above can be obtained.

At least one of the imaging units 12101 to 12104 may have a function of acquiring distance information. For example, at least one of the imaging units 12101 to 12104 may be a stereo camera including a plurality of imaging elements, or an imaging element including a pixel for detecting a phase difference.

For example, by obtaining a distance to each three-dimensional object in the imaging ranges 12111 to 12114 and a temporal change of the distance (relative speed with respect to the vehicle 12100) based on the distance information obtained from the imaging units 12101 to 12104, the microcomputer 12051 can specifically extract, as a preceding vehicle, the closest three-dimensional object on an advancing route of the vehicle 12100 that is traveling at a predetermined speed (for example, 0 km/h or more) in substantially the same direction as the vehicle 12100. Furthermore, the microcomputer 12051 can set an inter-vehicle distance that should be secured in advance before the preceding vehicle, and perform automatic brake control (including following stop control), an automatic acceleration control (including following start control), and the like. In this way, it is possible to perform cooperative control for the purpose of automatic driving and the like for autonomously traveling without an operation by the driver.

For example, based on the distance information obtained from the imaging units 12101 to 12104, the microcomputer 12051 can extract three-dimensional object data related to the three-dimensional object to be classified into a two-wheel vehicle, an ordinary vehicle, a large-size vehicle, a pedestrian, and other three-dimensional objects such as a utility pole, and can use the three-dimensional object data for automatically avoiding an obstacle. For example, the microcomputer 12051 distinguishes obstacles around the vehicle 12100 into an obstacle that can be visually recognized by the driver of the vehicle 12100 and an obstacle that is difficult to be visually recognized by the driver. The microcomputer 12051 then determines a collision risk indicating a degree of risk of collision with each obstacle, and in a situation in which the collision risk is equal to or larger than a set value and there is a possibility of collision, the microcomputer 12051 can perform driving support for avoiding collision by outputting a warning to the driver via the audio speaker 12061 or the display unit 12062, or by performing forced deceleration or avoidance steering via the driving system control unit 12010.

At least one of the imaging units 12101 to 12104 may be an infrared camera for detecting infrared rays. For example, the microcomputer 12051 can recognize a pedestrian by determining whether the pedestrian is present in taken images of the imaging units 12101 to 12104. For example, such recognition of the pedestrian is performed through a procedure of extracting characteristic points in the taken images of the imaging units 12101 to 12104 as infrared cameras, and a procedure of performing pattern matching processing on a series of characteristic points indicating an outline of an object to determine whether the object is a pedestrian. When the microcomputer 12051 determines that a pedestrian is present in the taken images of the imaging units 12101 to 12104 and recognizes the pedestrian, the voice image output unit 12052 controls the display unit 12062 to superimpose a square outline on the recognized pedestrian to be displayed for enhancement. The voice image output unit 12052 may also control the display unit 12062 to display an icon and the like indicating a pedestrian at a desired position.

An example of the vehicle control system to which the technique according to the present disclosure may be applied has been described above. The technique according to the present disclosure may be applied to, for example, the imaging unit 12031 among the configurations described above. By applying the technique according to the present disclosure to the imaging unit 12031, the imaging unit 12031 can be stably controlled.

The effects described herein are merely examples, and do not intend to limit the invention. Other effects may be exhibited.

The present technique can also employ the configurations described below.

(1) A light receiving device comprising:

a light receiving element in which a current flows because of avalanche multiplication caused in accordance with a photon that has been incident on the light receiving element in a state in which the light receiving element is charged to a predetermined potential based on a bias voltage, the light receiving element returning to said state by a recharge current;

a detection unit configured to detect the current, and invert an output signal in a case in which a current value of the current exceeds a threshold;

a current source configured to supply the recharge current to the light receiving element; and a switch unit configured to control supply of the bias voltage to the light receiving element in accordance with the output signal of the detection unit.

(2) The light receiving device according to the above (1), wherein, in a case in which the bias voltage is supplied to the light receiving element, the switch unit supplies, to the light receiving element, a current having a current value smaller than a current value of a predetermined holding current which allows the light receiving element to maintain the avalanche multiplication.

(3) The light receiving device according to the above (2), wherein the current source supplies, to the light receiving element, the recharge current having a current value smaller than the current value of the holding current, and the switch unit supplies, to the light receiving element, a current having a current value smaller than the current value of the holding current in a case in which the bias voltage is supplied to the light receiving element.

(4) The light receiving device according to any one of the above (1) to (3), wherein the current source supplies, to the light receiving element, the recharge current having a current value with which a time from when the output signal of the detection unit is inverted in accordance with the avalanche multiplication caused in the light receiving element until the output signal is inverted again in accordance with supply of the recharge current becomes equal to or longer than a time for discharging electric charges that have accumulated because of internal light emission corresponding to the current flow due to the avalanche multiplication caused in the light receiving element.

(5) The light receiving device according to any one of the above (1) to (4), wherein the switch unit controls supply of the bias voltage to the light receiving element in accordance with the output signal of the detection unit that is supplied via a circuit that does not change logic of the output signal.

(6) The light receiving device according to any one of the above (1) to (5), wherein the switch unit controls supply of the bias voltage to the light receiving element in accordance with the output signal of the detection unit that is supplied via a circuit selected from among a plurality of circuits that do not change logic of the output signal.

(7) The light receiving device according to any one of the above (1) to (6), further comprising a setting unit configured to set control of supply of the bias voltage to the light receiving element by the switch unit to be valid or invalid.

(8) The light receiving device according to any one of the above (1) to (7), wherein the current source supplies the recharge current to the light receiving element while allowing a current value to be variable.

(9) The light receiving device according to any one of the above (1) to (8), wherein the current source and a supply source of the bias voltage in the switch unit are connected to different power supplies.

(10) The light receiving device according to any one of the above (1) to (9), further comprising:

a first substrate; and a second substrate on which the first substrate is laminated, wherein at least the light receiving element is disposed on the first substrate, and at least part of the detection unit, the current source, and the switch unit is disposed on the second substrate.

(11) A range-finding device comprising:

a light receiving element in which a current flows because of avalanche multiplication caused in accordance with a photon that has been incident on the light receiving element in a state in which the light receiving element is charged to a predetermined potential based on a bias voltage, the light receiving element returning to said state by a recharge current;

a detection unit configured to detect the current, and invert an output signal in a case in which a current value of the current exceeds a threshold;

a current source configured to supply the recharge current to the light receiving element;

a switch unit configured to control supply of the bias voltage to the light receiving element in accordance with the output signal of the detection unit;

a time measurement unit configured to measure a time from a light emission timing when a light source emits light to a light reception timing when the light receiving element receives light, and acquire a measured value;

a histogram generation unit configured to generate a histogram of the measured value; and an arithmetic unit configured to compute a distance to an object to be measured based on the histogram.

(12) The range-finding device according to the above (11), wherein, in a case in which the bias voltage is supplied to the light receiving element, the switch unit supplies, to the light receiving element, a current having a current value smaller than a current value of a predetermined holding current which allows the light receiving element to maintain the avalanche multiplication.

(13) The range-finding device according to the above (12), wherein the current source supplies, to the light receiving element, the recharge current having a current value smaller than the current value of the holding current, and the switch unit supplies, to the light receiving element, a current having a current value smaller than the current value of the holding current in a case in which the bias voltage is supplied to the light receiving element.

(14) The range-finding device according to any one of the above (11) to (13), wherein the current source supplies, to the light receiving element, the recharge current having a current value with which a time from when the output signal of the detection unit is inverted in accordance with the avalanche multiplication caused in the light receiving element until the output signal is inverted again in accordance with supply of the recharge current becomes equal to or longer than a time for discharging electric charges that have accumulated because of internal light emission corresponding to the current flow due to the avalanche multiplication caused in the light receiving element.

(15) The range-finding device according to any one of the above (11) to (14), wherein the switch unit controls supply of the bias voltage to the light receiving element in accordance with the output signal of the detection unit that is supplied via a circuit that does not change logic of the output signal.

(16) The range-finding device according to any one of the above (11) to (15), wherein the switch unit controls supply of the bias voltage to the light receiving element in accordance with the output signal of the detection unit that is supplied via a circuit selected from among a plurality of circuits that do not change logic of the output signal.

(17) The range-finding device according to any one of the above (11) to (16), further comprising a setting unit configured to set control of supply of the bias voltage to the light receiving element by the switch unit to be valid or invalid.

(18) The range-finding device according to any one of the above (11) to (17), wherein the current source supplies the recharge current to the light receiving element while allowing a current value to be variable.

(19) The range-finding device according to any one of the above (11) to (18), wherein the current source and a supply source of the bias voltage in the switch unit are connected to different power supplies.

(20) The range-finding device according to any one of the above (11) to (19), further comprising:

a first substrate; and a second substrate on which the first substrate is laminated, wherein at least the light receiving element is disposed on the first substrate, and at least part of the detection unit, the current source, and the switch unit is disposed on the second substrate.

REFERENCE SIGNS LIST

1 RANGE-FINDING DEVICE
10, 10a, 10b, 10c, 10d, 10e, 10f, 10g, 10h PIXEL

US 12,607,725 B2

35                                                                                      36

210 UPPER CHIP
211 LOWER CHIP
1000 LIGHT RECEIVING ELEMENT
1001, 1001', 1010, 1020, 1022, 1023, 1100, 1110, 1120
 TRANSISTOR
1002 INVERTER
1030, 1031, $1300_1$, $1300_2$, $1300_n$ PROCESSING CIR-
 CUIT
1032 SELECTOR
The invention claimed is:

1. A light receiving device comprising:
a light receiving element in which a current flows because
 of avalanche multiplication caused in accordance with
 a photon that has been incident on the light receiving
 element in a state in which the light receiving element
 is charged to a predetermined potential based on a bias
 voltage, the light receiving element returning to said
 state by a recharge current;
a detection circuit configured to invert a signal from an
 output node of the light receiving element in a case in
 which a current value of the current exceeds a thresh-
 old, the detection circuit including an inverter having
 an input and an output, the input being electrically
 connected to the output node of the light receiving
 element, the output providing an inversion of the signal
 from the output node of the light receiving element as
 an output signal;
a current source configured to supply the recharge current
 to the light receiving element; and
a switch circuit configured to control supply of the bias
 voltage to the light receiving element in accordance
 with the output signal, the switch circuit including a
 gate, a first terminal and a second terminal, the gate
 being directly electrically connected to the output of the
 inverter, the first terminal being electrically connected
 to a predetermined voltage, and the second terminal
 being electrically connected to the output node of the
 light receiving element, wherein
the current source supplies a first current as the recharge
 current in a first period, the first current causing the
 light receiving element to approach said state of being
 charged to the predetermined potential at a first rate,
 and
in response to the output signal from the detection circuit,
 the switch circuit provides a second current as the
 recharge current in a second period, the second current
 causing the light receiving element to approach said
 state of being charged to the predetermined potential at
 a second rate that is faster than the first rate.

2. The light receiving device according to claim 1,
wherein, in a case in which the bias voltage is supplied to the
light receiving element, the switch circuit supplies, to the
light receiving element, a current having a current value
smaller than a current value of a predetermined holding
current which allows the light receiving element to maintain
the avalanche multiplication.

3. The light receiving device according to claim 2,
wherein
the current source supplies, to the light receiving element,
 the recharge current having a current value smaller than
 the current value of the holding current, and
the switch circuit supplies, to the light receiving element,
 a current having a current value smaller than the current
 value of the holding current in a case in which the bias
 voltage is supplied to the light receiving element.

4. The light receiving device according to claim 1,
wherein the current source supplies, to the light receiving element, the recharge current having a current value with
which a time from when the output signal of the detection
circuit is inverted in accordance with the avalanche multi-
plication caused in the light receiving element until the
output signal is inverted again in accordance with supply of
the recharge current becomes equal to or longer than a time
for discharging electric charges that have accumulated
because of internal light emission corresponding to the
current flow due to the avalanche multiplication caused in
the light receiving element.

5. The light receiving device according to claim 1,
wherein the switch circuit controls supply of the bias voltage
to the light receiving element in accordance with the output
signal of the detection circuit that is supplied via a circuit
that does not change logic of the output signal.

6. The light receiving device according to claim 1,
wherein the switch circuit controls supply of the bias voltage
to the light receiving element in accordance with the output
signal of the detection circuit that is supplied via a circuit
selected from among a plurality of circuits that do not
change logic of the output signal.

7. The light receiving device according to claim 1, further
comprising a setting circuit configured to set control of
supply of the bias voltage to the light receiving element by
the switch circuit to be valid or invalid.

8. The light receiving device according to claim 1,
wherein the current source supplies the recharge current to
the light receiving element while allowing a current value to
be variable.

9. The light receiving device according to claim 1,
wherein the current source and a supply source of the bias
voltage in the switch circuit are connected to different power
supplies.

10. The light receiving device according to claim 1,
further comprising:
a first substrate; and
a second substrate on which the first substrate is lami-
 nated, wherein
at least the light receiving element is disposed on the first
 substrate, and
at least part of the detection circuit, the current source, and
 the switch circuit is disposed on the second substrate.

11. The light receiving device according to claim 1,
wherein the first rate is at a first linear slope and the second
rate is at a second linear slope that is greater than the first
linear slope.

12. A range-finding device comprising:
a light receiving element in which a current flows because
 of avalanche multiplication caused in accordance with
 a photon that has been incident on the light receiving
 element in a state in which the light receiving element
 is charged to a predetermined potential based on a bias
 voltage, the light receiving element returning to said
 state by a recharge current;
a detection circuit configured to invert a signal from an
 output node of the light receiving element in a case in
 which a current value of the current exceeds a thresh-
 old, the detection circuit including an inverter having
 an input and an output, the input being electrically
 connected to the output node of the light receiving
 element, the output providing an inversion of the signal
 from the output node of the light receiving element as
 an output signal;
a current source configured to supply the recharge current
 to the light receiving element;
a switch circuit configured to control supply of the bias
 voltage to the light receiving element in accordance with the output signal, the switch circuit including a gate, a first terminal and a second terminal, the gate being directly electrically connected to the output of the inverter, the first terminal being electrically connected to a predetermined voltage, and the second terminal being electrically connected to the output node of the light receiving element;

a time measurement unit configured to measure a time from a light emission timing when a light source emits light to a light reception timing when the light receiving element receives light, and acquire a measured value;

a histogram generation unit configured to generate a histogram of the measured value; and an arithmetic unit configured to compute a distance to an object to be measured based on the histogram, wherein the current source supplies a first current as the recharge current in a first period, the first current causing the light receiving element to approach said state of being charged to the predetermined potential at a first rate, and in response to the output signal from the detection circuit, the switch circuit provides a second current as the recharge current in a second period, the second current causing the light receiving element to approach said state of being charged to the predetermined potential at a second rate that is faster than the first rate.

13. The range-finding device according to claim 12, wherein, in a case in which the bias voltage is supplied to the light receiving element, the switch circuit supplies, to the light receiving element, a current having a current value smaller than a current value of a predetermined holding current which allows the light receiving element to maintain the avalanche multiplication.

14. The range-finding device according to claim 13, wherein the current source supplies, to the light receiving element, the recharge current having a current value smaller than the current value of the holding current, and the switch circuit supplies, to the light receiving element, a current having a current value smaller than the current value of the holding current in a case in which the bias voltage is supplied to the light receiving element.

15. The range-finding device according to claim 12, wherein the current source supplies, to the light receiving element, the recharge current having a current value with which a time from when the output signal of the detection circuit is inverted in accordance with the avalanche multiplication caused in the light receiving element until the output signal is inverted again in accordance with supply of the recharge current becomes equal to or longer than a time for discharging electric charges that have accumulated because of internal light emission corresponding to the current flow due to the avalanche multiplication caused in the light receiving element.

16. The range-finding device according to claim 12, wherein the switch circuit controls supply of the bias voltage to the light receiving element in accordance with the output signal of the detection circuit that is supplied via a circuit that does not change logic of the output signal.

17. The range-finding device according to claim 12, wherein the switch circuit controls supply of the bias voltage to the light receiving element in accordance with the output signal of the detection circuit that is supplied via a circuit selected from among a plurality of circuits that do not change logic of the output signal.

18. The range-finding device according to claim 12, further comprising a setting circuit configured to set control of supply of the bias voltage to the light receiving element by the switch circuit to be valid or invalid.

19. The range-finding device according to claim 12, wherein the current source supplies the recharge current to the light receiving element while allowing a current value to be variable.

20. The range-finding device according to claim 12, wherein the current source and a supply source of the bias voltage in the switch circuit are connected to different power supplies.

21. The range-finding device according to claim 12, further comprising:

a first substrate; and a second substrate on which the first substrate is laminated, wherein at least the light receiving element is disposed on the first substrate, and at least part of the detection circuit, the current source, and the switch circuit is disposed on the second substrate.

22. The range-finding device according to claim 12, wherein the first rate is at a first linear slope and the second rate is at a second linear slope that is greater than the first linear slope.

* * * * *